(12) United States Patent
Watanabe

(10) Patent No.: US 10,175,486 B2
(45) Date of Patent: Jan. 8, 2019

(54) OPTICAL ASSEMBLY FOR HEAD-MOUNTED DISPLAY AND HEAD-MOUNTED DISPLAY

(71) Applicant: NIKON CORPORATION, Tokyo (JP)

(72) Inventor: Nobuaki Watanabe, Oyama (JP)

(73) Assignee: NIKON CORPORATION, Tokyo (JP)

( * ) Notice: Subject to any disclaimer, the term of this patent is extended or adjusted under 35 U.S.C. 154(b) by 249 days.

(21) Appl. No.: 15/023,256

(22) PCT Filed: Oct. 2, 2014

(86) PCT No.: PCT/JP2014/076385
§ 371 (c)(1),
(2) Date: Jul. 1, 2016

(87) PCT Pub. No.: WO2015/050194
PCT Pub. Date: Apr. 9, 2015

(65) Prior Publication Data
US 2016/0320619 A1    Nov. 3, 2016

(30) Foreign Application Priority Data

Oct. 2, 2013  (JP) ................................ 2013-207295

(51) Int. Cl.
*G02B 27/01* (2006.01)
*G02B 3/06* (2006.01)
(Continued)

(52) U.S. Cl.
CPC ........... *G02B 27/0172* (2013.01); *G02B 3/06* (2013.01); *G02B 5/0294* (2013.01); *G02B 13/18* (2013.01);
(Continued)

(58) Field of Classification Search
CPC ......... G02B 27/0172; G02B 9/12–9/32; G02B 13/04; G02B 13/18; G02B 2027/011;
(Continued)

(56) References Cited

U.S. PATENT DOCUMENTS 6,480,337 B2 * 11/2002 Inoguchi ................ G03B 21/10
359/630
6,646,811 B2 * 11/2003 Inoguchi ............ G02B 17/0812
359/630
(Continued)

FOREIGN PATENT DOCUMENTS

JP          3382683      12/2002

*Primary Examiner* — Nicholas R. Pasko

(57) ABSTRACT

A head-mounted display optical system includes: a light deflecting element; a first lens group that has a positive refracting power as a whole, includes a plurality of rotationally symmetrical lenses and one free-form surface lens, and condenses the light incident through the light deflecting element; a second lens group that includes one lens having a positive refracting power that is arranged in a vicinity of an imaging position of an intermediate image formed by the first lens group; a third lens group that includes one rotationally symmetrical lens and one free-form surface lens; and a light reflecting element that has a free-form surface shape formed in a rotationally asymmetrical manner with respect to the optical axis and has a reflection surface that reflects the light having transmitted through the third lens group, in a sequence from a side of the light source side.

10 Claims, 8 Drawing Sheets

(51) Int. Cl.
*G02B 5/02* (2006.01)
*G02B 13/18* (2006.01)
*G02B 17/08* (2006.01)
*G02B 25/00* (2006.01)

(52) U.S. Cl.
CPC ............ *G02B 17/08* (2013.01); *G02B 25/001* (2013.01); *G02B 2027/011* (2013.01); *G02B 2027/015* (2013.01); *G02B 2027/0116* (2013.01); *G02B 2027/0152* (2013.01); *G02B 2027/0178* (2013.01)

(58) Field of Classification Search
CPC ...... G02B 2027/0116; G02B 2027/015; G02B 2027/0152; G02B 2027/0178
USPC ....... 359/629–633, 645, 689, 716, 733, 735, 359/784, 791, 792
See application file for complete search history.

(56) References Cited

U.S. PATENT DOCUMENTS

| | | | | |
|---|---|---|---|---|
| 7,542,209 B2* | 6/2009 | McGuire, Jr. | ...... | G02B 27/0081 359/630 |
| 7,701,639 B2* | 4/2010 | Hisada | ........... | G02B 13/16 359/649 |
| 7,766,488 B2* | 8/2010 | Hirata | ............ | H04N 9/317 353/101 |
| 7,821,475 B2* | 10/2010 | Tsuyuki | ............ | G02B 17/026 345/204 |
| 7,894,138 B2* | 2/2011 | Fujimoto | ........... | G02B 27/0172 359/618 |
| 2013/0222896 A1* | 8/2013 | Komatsu | ............ | G02B 17/0848 359/365 |

* cited by examiner

OPTICAL ASSEMBLY FOR HEAD-MOUNTED DISPLAY AND HEAD-MOUNTED DISPLAY

CROSS-REFERENCE TO RELATED APPLICATIONS

This application claims the benefit under 35 U.S.C. Section 371, of PCT International Application Number PCT/JP2014/076385, filed Oct. 2, 2014, and which claims the foreign priority benefit under 35 U.S.C. Section 119 of Japanese Application No. 2013-207295, filed Oct. 2, 2013 in Japan, the contents of which are incorporated herein by reference.

TECHNICAL FIELD

The present invention relates to a head-mounted display optical system and a head-mounted display.

BACKGROUND ART

A head-mounted type display (head-mounted display) is known (see PTL1). Some head-mounted displays are configured so that an image is drawn on a retina by moving light from a light source at a high speed using a light deflecting element such as a galvanomirror, for example. If it is attempted to enhance an optical performance of such a head-mounted display, the number of lenses is increased and a glass material having a high specific gravity has to be used in order to sufficiently correct a chromatic aberration, which results in an increase in size and weight of the optical system and a significant deterioration in usability and designability. In particular, this tendency is stronger when only rotationally symmetrical lens elements such as spherical lenses are used.

CITATION LIST

Patent Literature

PTL1: Japanese Patent No. 3382683

SUMMARY OF INVENTION

Technical Problem

Thus, in conventional head-mounted displays, it is difficult to simultaneously achieve both a reduction in size and weight and an excellent optical performance.

Solution to Problem

According to the 1st aspect of the present invention, a head-mounted display optical system comprises: a light deflecting element that changes a propagating direction of light from a light source; a first lens group that has a positive refracting power as a whole, includes a plurality of rotationally symmetrical lenses formed in a rotationally symmetrical manner with respect to an optical axis and one free-form surface lens formed in a rotationally asymmetrical manner with respect to the optical axis, and condenses the light incident through the light deflecting element; a second lens group that includes one lens having a positive refracting power that is arranged in a vicinity of an imaging position of an intermediate image formed by the first lens group; a third lens group that includes one rotationally symmetrical lens formed in a rotationally symmetrical manner with respect to the optical axis and one free-form surface lens formed in a rotationally asymmetrical manner with respect to the optical axis; and a light reflecting element that has a free-form surface shape formed in a rotationally asymmetrical manner with respect to the optical axis and has a reflection surface that reflects the light having transmitted through the third lens group, in a sequence from a side of the light source side, wherein: the light having reflected from the reflection surface and arrived at a drawing surface, which is assumed to be located on a retina of an user, moves on the drawing surface in accordance with changes of the propagating direction of the light from the light source made by the light deflecting element, so that an image is drawn on the drawing surface.

According to the 2nd aspect of the present invention, in the head-mounted display optical system according to the 1st aspect, it is preferred that given that a coordinate axis in a direction of the optical axis between the light deflecting element and the light reflecting element is a z-axis, a coordinate axis perpendicular to the z-axis in a cross section including the optical axis between the light deflecting element and the light reflecting element and the optical axis between the light reflecting element and the drawing surface is a y-axis, and a coordinate axis perpendicular to the z-axis and the y-axis is a x-axis, then at least one lens surface of the lens constituting the second lens group is formed as a X-toroidal surface having an aspherical shape in the x-axis direction.

According to the 3rd aspect of the present invention, in the head-mounted display optical system according to the 2nd aspect, it is preferred that a lens surface on a side of the light reflecting element of the lens constituting the second lens group is formed as the X-toroidal surface, and given that a radius of curvature in the x-axis direction is Rx and a radius of curvature in the y-axis direction is Ry, then the inequality (6) of the embodiment is satisfied.

According to the 4th aspect of the present invention, in the head-mounted display optical system according to any one of the 1st to 3rd aspects, it is preferred that: the lens constituting the second lens group has a convex meniscus shape on a side of the light reflecting element, and a lens surface closer to the imaging position of the intermediate image has a function as a diffusion plate that diffuses the light from the light source; and given that a coordinate axis in a direction of the optical axis between the light deflecting element and the light reflecting element is a z-axis, a coordinate axis perpendicular to the z-axis in a cross section including the optical axis between the first lens group and the light reflecting element and the optical axis between the light reflecting element and the drawing surface is a y-axis, a radius of curvature in the y-axis direction of the lens surface having a function as the diffusion plate is Ry1, and a radius of curvature in the y-axis direction of a lens surface opposite to the above described lens surface is Ry2 in the lens constituting the second lens group, then the inequality (7) of the embodiment is satisfied According to the 5th aspect of the present invention, in the head-mounted display optical system according to any one of the 1st to 4th aspects, it is preferred that: given that a coordinate axis in a direction of the optical axis between the light deflecting element and the light reflecting element is a z-axis, a coordinate axis perpendicular to the z-axis in a cross section including the optical axis between the light deflecting element and the light reflecting element and the optical axis between the light reflecting element and the drawing surface is a y-axis, and a coordinate axis perpendicular to the z-axis and the y-axis is a x-axis, a coordinate system (x, y, z) having an intersection point between a lens surface of the free-form surface lens and the optical axis as an origin is defined in the third lens group, and further given that a coefficient of $x^2$ term is fC4, a coefficient of $x^4$ term is fC11, a coefficient of $y^2$ term is fC6, and a coefficient of $y^4$ term is fC15 for a lens surface on a side of the rotationally symmetrical lens of the free-form surface lens and a coefficient of $x^2$ term is rC4, a coefficient of $x^4$ term is rC11, a coefficient of $y^2$ term is rC6, and a coefficient of $y^4$ term is rC15 for a lens surface opposite to the above described lens surface in a case where a sag amount z of the lens surfaces of the free-form surface lens is represented by a polynomial of x and y, the equations (8) and (9) of the embodiment are defined, then the inequality (10) of the embodiment is satisfied, and additionally, given that, in the third lens group, a radius of curvature of a lens surface on a side of the free-form surface lens of the rotationally symmetrical lens is Rrot and a distance on the optical axis between the rotationally symmetrical lens and the free-form surface lens is D, then the inequalities (40) and (41) of the embodiment are satisfied.

According to the 6th aspect of the present invention, in the head-mounted display optical system according to any one of the 1st to 5th aspects, it is preferred that: given that a coordinate axis in a direction of the optical axis between the light deflecting element and the light reflecting element is a z-axis, a coordinate axis perpendicular to the z-axis in a cross section including the optical axis between the light deflecting element and the light reflecting element and the optical axis between the light reflecting element and the drawing surface is a y-axis, and a coordinate axis perpendicular to the z-axis and the y-axis is a x-axis, a coordinate system (x, y, z) having an intersection point between a lens surface of the free-form surface lens and the optical axis as an origin is defined in the first lens group, and further given that a coefficient of the $x^2$ term is C4 and a coefficient of the $y^2$ term is C6 in a case where a sag amount z of the lens surface of the free-form surface lens is represented by a polynomial of x and y, then the inequality (43) of the embodiment is satisfied.

According to the 7th aspect of the present invention, in the head-mounted display optical system according to any one of the 1st to 6th aspects, it is preferred that: given that a focal length of the whole first lens group is f1 and a distance on the optical axis between the light deflecting element and the light reflecting element is L, then the inequality (44) of the embodiment is satisfied.

According to the 8th aspect of the present invention, in the head-mounted display optical system according to any one of the 1st to 7th aspects, it is preferred that: given that a refractive index with respect to a d-line is Nd, a refractive index with respect to a F-line is NF, and a refractive index with respect to a C-line is NC, an Abbe number is defined by the equation (47) of the embodiment, and given that a maximum of a difference between Abbe numbers vd of the plurality of rotationally symmetrical lenses of the first lens group is Δvd1 and a difference between Abbe numbers vd of the rotationally symmetrical lens and the free-form surface lens of the third lens group is Δvd2, then the inequalities (45) and (46) of the embodiment are satisfied.

According to the 9th aspect of the present invention, in the head-mounted display optical system according to any one of the 1st to 8th aspects, it is preferred that: given that a coordinate axis in a direction of the optical axis between the light deflecting element and the light reflecting element is a z-axis, a coordinate axis perpendicular to the z-axis in a cross section including the optical axis between the light deflecting element and the light reflecting element and the optical axis between the light reflecting element and the drawing surface is a y-axis, and a negative direction of the y-axis is a direction to which the optical axis is folded by the light reflecting element; and in the light reflecting element, a figure formed by combining four points is a trapezoidal shape, at which points main light rays among light rays arriving at the reflection surface arrive, the main light rays having angles of view corresponding to respective four corners of the image, and given that a base in a positive direction of the y-axis among bases of the trapezoidal shape is an upper base, a base in a negative direction is a lower base, a length of the upper base is $L_{up}$, and a length of the lower base is $L_{und}$, then the inequality (48) of the embodiment is satisfied.

According to the 10th aspect of the present invention, in the head-mounted display optical system according to any one of the 1st to 9th aspects, it is preferred that: the light reflecting element is made of a light transmission material and configured to be able to transmit light incident from a surface opposite to the reflection surface; and the image is drawn on the drawing surface, superimposed on an image formed by the light having transmitted through the light reflecting element and arrived at the drawing surface.

According to the 11th aspect of the present invention, a head-mounted display comprises the head-mounted display optical system according to any one of the 1st to 10th aspects.

Advantageous Effects of Invention

According to the present invention, both a reduction in size and weight and a good optical performance can be achieved.

DESCRIPTION OF EMBODIMENTS

Figure 1:
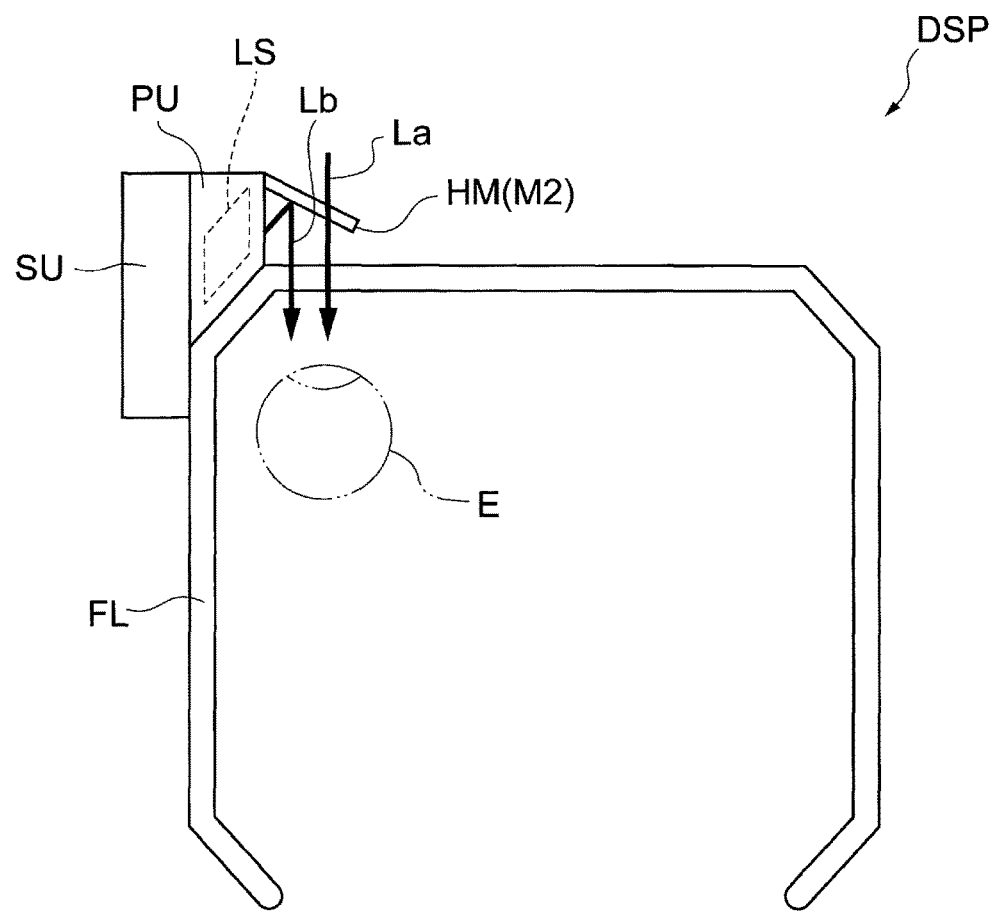
[FIG. 1] A view explaining a configuration of a head-mounted display.

One embodiment of the present invention will now be described in reference to the drawings. FIG. 1 is a view explaining a schematic configuration of a head-mounted display DSP having a head-mounted display optical system (hereinafter referred to as a HMD optical system) according to one embodiment of the present invention. The head-mounted display DSP is configured to include an eye-glasses-type frame FL, a light source unit SU, and a projector unit PU. The eye-glasses-type frame FL holds the light source unit SU and the projector unit PU and is mounted on a head of an user, together with the light source unit SU and the projector unit PU. The light source unit SU generates an image signal on the basis of image information input from an external input device (not shown) and emits a laser light (also hereinafter referred to as an "image light") having a strength according to the image signal to the projector unit PU.

The projector unit PU scans the image light emitted from the light source unit SU in a two-dimensional direction and projects the image light to an eye E of the user. Thereby, when the user wears the head-mounted display DSP, the image light is scanned in a two-dimensional direction and an image is projected on a retina of the eye E of the user so that the user can visually recognize the image according to the image signal. The projector unit PU is also provided with a half mirror HM at a position opposite to the eye E of the user. An external light La transmits through the half mirror HM and is incident on the eye E of the user, while the image light Lb which is emitted from the projector unit PU is reflected from the half mirror BM and is incident on the eye E of the user. Thereby, the user can visually recognize the image based on the image light Lb in a superimposed manner with an outer scene based on the external light La.

The projector unit PU includes the HMD optical system LS. The HMD optical system LS will now be specifically described.

Figure 2:
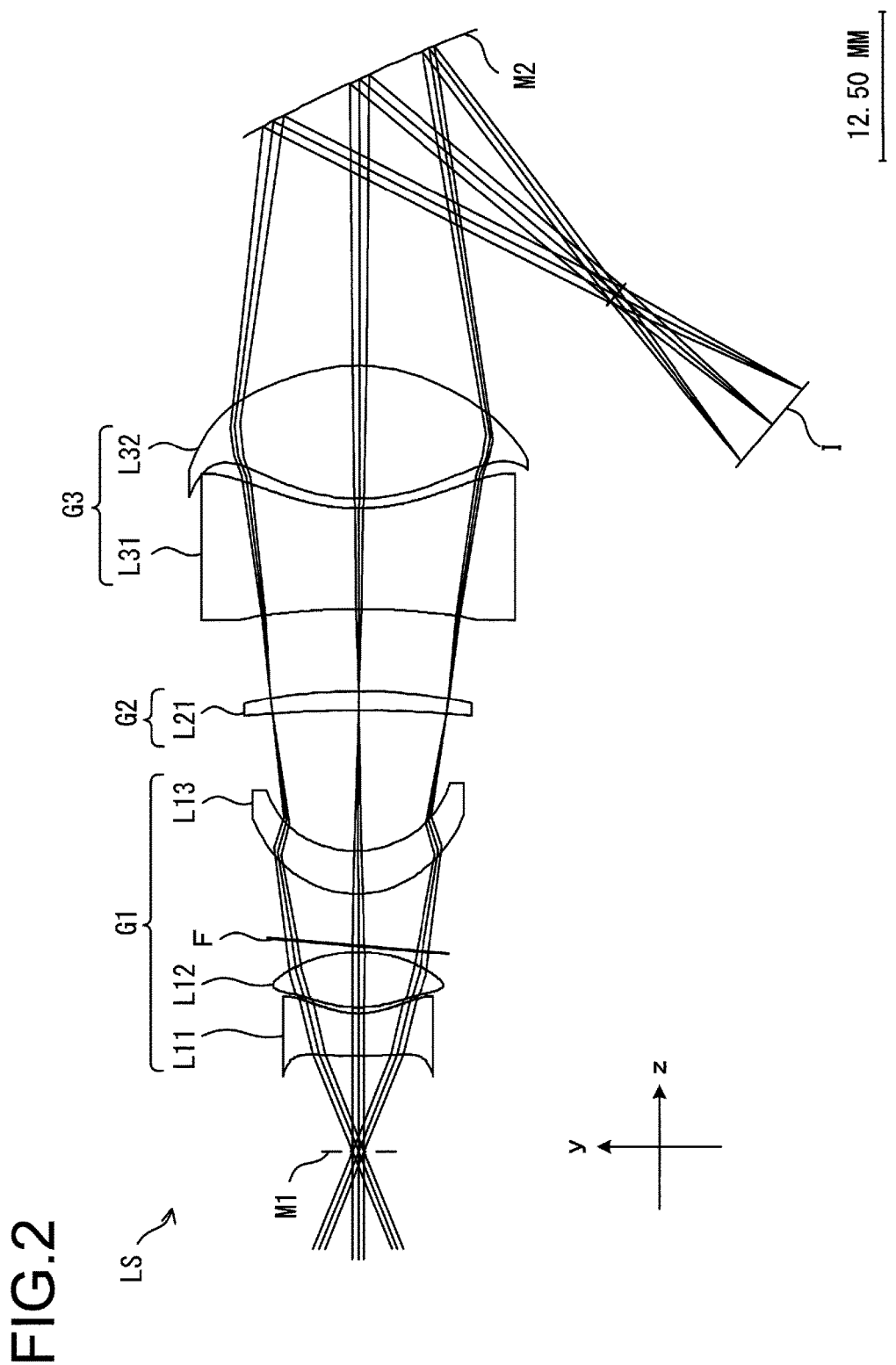
[FIG. 2] A view explaining a configuration of a head-mounted display optical system in a y-z plane.
Figure 3:
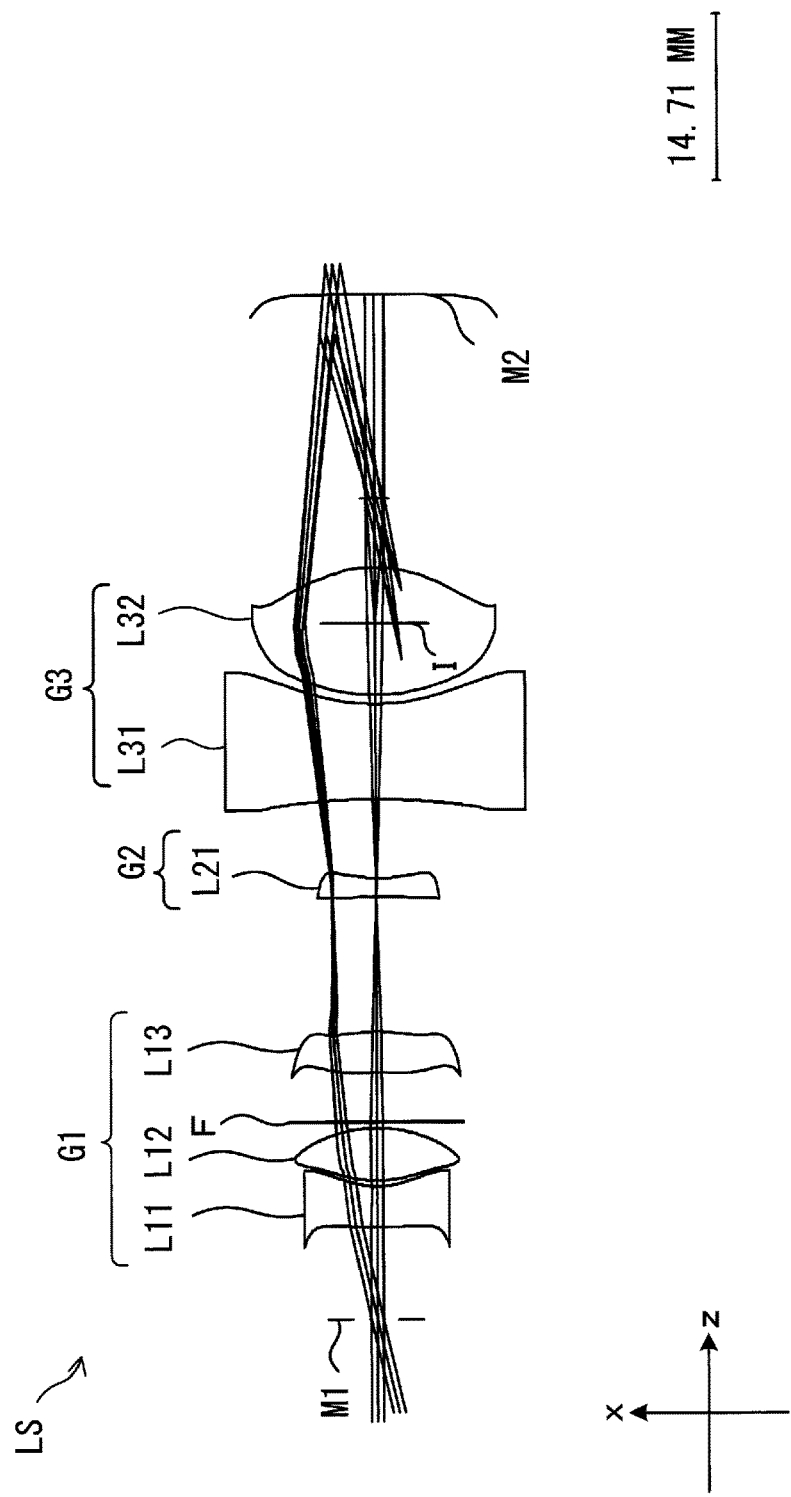
[FIG. 3] A view explaining a configuration of the head-mounted display optical system in a x-z plane.

FIGS. 2 and 3 are views explaining a configuration of the HMD optical system LS. FIG. 2 shows the configuration in a y-z plane, and FIG. 3 shows the configuration in a x-z plane. The HMD optical system LS includes a light deflecting element M1, a first lens group G1, a second lens group G2, a third lens group G3, and a light reflecting element M2, in this sequence from a light source (not shown) side, the light source emitting the image light.

The light deflecting element M1 changes a propagating direction of the light from the light source. It will be noted that for the sake of simplifying the explanation, changes in the propagating direction of the light in the deflecting element M1 are represented by lights that pass through a diaphragm (this diaphragm is shown as the light deflecting element M1) at a plurality of incident angles in FIGS. 2 and 3.

The first lens group G1 has a positive refracting power as a whole and is composed of two rotationally symmetrical lenses L11, L12 that are formed in a rotationally symmetrical manner with respect to an optical axis and one free-form surface lens L13 that is formed in a rotationally asymmetrical manner with respect to the optical axis in order to condense the light that is incident through the light deflecting element M1.

The second lens group G2 is composed of one lens L21 having a positive refracting power that is arranged in the vicinity of an imaging position (an intermediate imaging position) of an intermediate image formed by the first lens group G1.

The third lens group G3 is composed of one rotationally symmetrical lens L31 that is formed in a rotationally symmetrical manner with respect to an optical axis and one free-form surface lens L32 that is formed in a rotationally asymmetrical manner with respect to the optical axis.

The light reflecting element M2 has a free-form surface shape formed in a rotationally asymmetrical manner with respect to the optical axis and has a reflection surface that reflects the light having transmitted through the third lens group G3. It will be noted that in the head-mounted display DSP in this embodiment, the light reflecting element M2 corresponds to the half mirror HM in FIG. 1.

In the configuration of the HMD optical system LS, a light having reflected from the reflection surface of the light reflecting element M2 and arrived at a drawing surface I, which is assumed to be located on the retina of the user, moves on the drawing surface I at a high speed in accordance with changes in the propagating direction of the light from the light source made by the light deflecting element M1, so that an image is drawn on the drawing surface I.

The HMD optical system LS reflects the light that has been emitted from the light source with a propagating direction changed by the light deflecting element M1 and further has transmitted through the first lens group G1 to the third lens group G3, in an oblique direction by means of the light reflecting element M2 to fold the optical path of the light, so that a reduction in size of the whole configuration can be achieved. In addition, in the HMD optical system LS, by providing the free-form surface lens that is rotationally asymmetrical with respect to the optical axis (the free-form surface lens L13 of the first lens group G1 and the free-form surface lens L32 of the third lens group G3), a rotationally asymmetrical aberration caused by reflecting the light from the light source in an oblique direction by the light reflecting element M2 can be corrected and the number of the lenses can be reduced in order to reduce the weight of the whole system.

Figure 4:
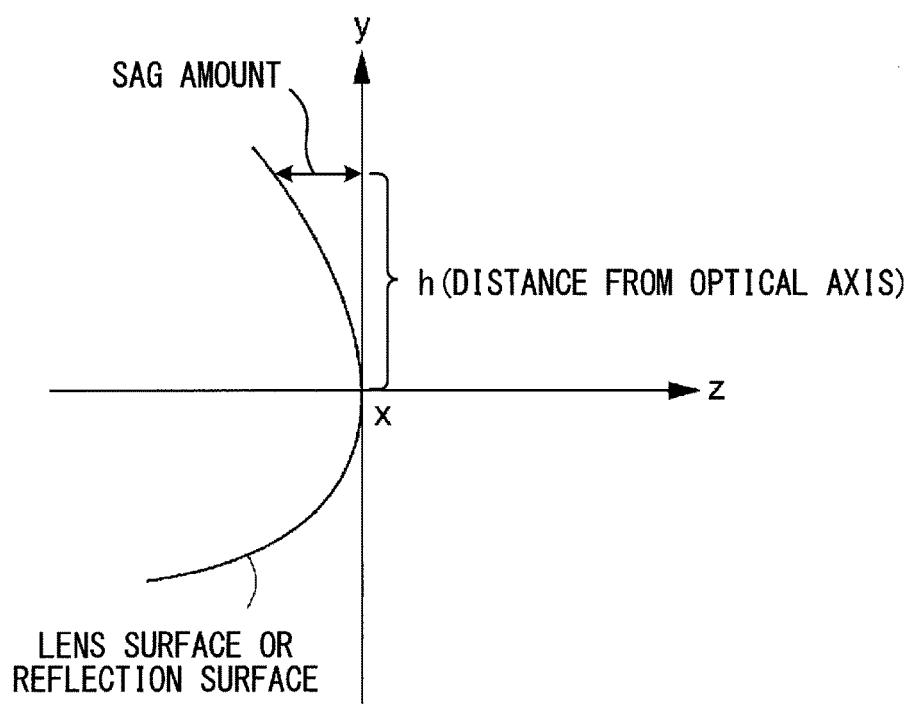
[FIG. 4] A view explaining one example of a local coordinate system.

A variety of definitions used in the explanation in this embodiment will now be described. First of all, a three-dimensional orthogonal coordinate system (local coordinate system) in each lens and reflection surface of the HMD optical system LS will be described. The local coordinate system of each lens and reflection surface is defined as a (x, y, z) coordinate system (right-handed system) having an intersection point of each lens surface or reflection surface and the optical axis as an origin, as shown in FIG. 4, for example. The z-axis of the local coordinate system corresponds to a coordinate axis in a direction of the optical axis between the light deflecting element M1 and the light reflecting element M2. A positive direction of the z-axis is defined as a direction from the light deflecting element M1 toward the light reflecting element M2. The y-axis of the local coordinate system is a coordinate axis perpendicular to the z-axis in a cross section that includes the optical axis between the light deflecting element M1 and the light reflecting element M2 and the optical axis between the light reflecting element M2 and the drawing surface I. A negative direction of the y-axis is defined as a direction in which the optical axis is folded by the light reflecting element M2. The x-axis of the local coordinate system is defined as a coordinate axis perpendicular to the z- and y-axes. A plane including the x- and z-axes is referred to as a x-z plane, a plane including the y- and z-axes is referred to as a y-z plane, and a plane including the x- and y-axes is referred to as a x-y plane.

It will be noted that in the HMD optical system LS, the optical axis means one axis that passes through a center of curvature of each rotationally symmetrical lens and is reflected from the reflection surface of the light reflecting element M2 (according to the law of reflection) to penetrate through a center point of the eye of the user.

Furthermore, an aspherical surface that is rotationally symmetrical with respect to the optical axis is defined as the following equation (1). In the equation (1), Z is a sag amount of a plane parallel to the optical axis, c is a curvature (the center is located on the optical axis), K is a conic coefficient, h is a distance in a perpendicular direction to the optical axis, measured from the optical axis, and A4-A20 are coefficients for respective power series terms of h.

[Math. 1]

$$Z = \frac{ch^2}{1+\sqrt{1-(1+K)c^2h^2}} A4h^4 + A6h^6 + A8h^8 + A10h^{10} + A12h^{12} + A14h^{14} + A16h^{16} + A18h^{18} + A20h^{20} \quad (1)$$

Furthermore, a X-toroidal surface is defined as following. The X-toroidal surface is a surface in which a curvature Xc in the x-axis direction and a curvature Xy in the y-axis direction are different from each other. Under this condition, a surface in the x-z plane represented by the following equation (2) will be considered. In the equation (2), Z is a sag amount in the x-z plane of the X-toroidal surface, Xc is a curvature (the center is located on the optical axis), K is a conic coefficient, x is a distance in the x-axis direction, and T4-T10 are coefficients for respective power series terms of x.

[Math. 2]

$$Z = \frac{Xcx^2}{1+\sqrt{1-(1+K)Xc^2x^2}} + T4x^4 + T6x^6 + T8x^8 + T10x^{10} \quad (2)$$

The X-toroidal surface is a surface obtained by rotating the surface represented by the equation (2) about a rotational axis parallel to the x-z plane, the rotational axis being located at a position shifted by a radius of curvature Ry in the y-axis direction from the origin of the local coordinate system.

Furthermore, a free-form surface that is rotationally asymmetrical with respect to the optical axis is defined as the following equation (3). The equation (3) represents a x-y polynomial surface (free-form surface) formed by a plurality of terms including a combination of x and y. In the equation (3), Z is a sag amount of a plane parallel to the optical axis, c is a curvature (the center is located on the optical axis), K is a conic constant, h is a distance from an origin in a plane that has the origin on the optical axis and perpendicularly intersects the optical axis at the origin, and Cj is a coefficient of a xy polynomial.

[Math. 3]

$$Z = \frac{ch^2}{1+\sqrt{1-(1+K)c^2h^2}} + \sum_{j=2}^{66} C_j x^m y^n \quad (3)$$

It will be noted that relationships represented by the following equation (4) and inequality (5) are established between j, m, n in the equation (3).

[Math. 4]

$$j = \frac{(m+n)^2 + m + 3n}{2} + 1 \quad (4)$$

[Math. 5]

$$m + n \leq 10 \quad (5)$$

Now, conditions to be desirably satisfied in the HMD optical system LS in this embodiment will be described.

First of all, in the HMD optical system LS in this embodiment, it is desirable to form at least one lens surface of the lens L21 of the second lens group G2 as a X-toroidal surface having an aspherical shape in the x-axis direction.

If at least one lens surface of the lens L21 is formed as the X-toroidal surface, the lens surface formed as the X-toroidal surface forms a surface having different surface shapes in the x-axis direction and in the y-axis direction. Therefore, it is possible to efficiently correct different aberration components (astigmatism components) in the x-axis direction and in the y-axis direction which are to be generated by the reflection surface of the light reflecting element M2. Furthermore, because the lens surface can have different magnifications in the x direction and in the y direction, a balance of a trapezoidal distortion generated on the drawing surface (image surface) I can be adjusted, so that requirements on the free-form surfaces of the free-form surface lenses L13, L32 and the light reflecting element M2 can be reduced. If both lens surfaces of the lens L21 are not formed as the X-toroidal surfaces, the correction of the astigmatism components described above becomes difficult and the balance adjustment of the trapezoidal distortion becomes impossible. Thus, requirements on the free-form surfaces of the free-form surface lens L13, L32 and the light reflecting element M2 are increased, which is disadvantageous.

Furthermore, when the lens surface on the light reflecting element M2 side of the lens L21 is formed as the X-toroidal surface, it is more desirable to satisfy the following inequality (6), given that the radius of curvature in the x-axis direction is Rx, the radius of curvature in the y-axis direction is Ry.

[Math. 6]

$$-0.5 \leq \frac{Rx}{Ry} < 0 \quad (6)$$

Owing to the lens surface on the light reflecting element M2 side of the lens L21 formed as the X-toroidal surface, it is possible to receive light rays from respective angles of view in a wider region of the lens surface. Furthermore, by satisfying the inequality (6), it is possible to form this lens surface so as to have largely different surface shapes in the x-axis direction and in y-axis direction. Therefore, the correction of the astigmatism components of the aberrations and the adjustment of the trapezoidal distortion can be performed more finely.

Additionally, in the HMD optical system LS in this embodiment, it is desirable that the lens L21 of the second lens group G2 has a convex meniscus shape on the light reflecting element M2 side; a lens surface of the lens L21 closer to the intermediate imaging position made by the first lens group G1 has a function as a diffusion plate that diffuses the light from the light source; and the following inequality (7) is satisfied. In the inequality (7), a radius of curvature in the y-axis direction of the lens surface of the lens L21 closer to the intermediate imaging position is Ry1 and a radius of curvature in the y-axis direction of a lens surface opposite to the above described lens surface is Ry2.

[Math. 7]

$$0 < -\frac{|Ry2|}{Ry1} \leq 1 \qquad (7)$$

It will be noted that a microlens array is arranged over the entire lens surface of the lens L21 closer to the intermediate imaging position, in order to achieve the function as the diffusion plate, for example.

If the lens surface of the lens L21 closer to the intermediate imaging position has the function as the diffusion plate, a diameter of light flux after diffusion can be wider so that a pupil diameter becomes larger. In this way, an eye motion area (a region where vignetting does not occur when the eye moves) can be wider. Therefore, this configuration is preferable if the head-mounted display DSP is used as a mobile device.

Furthermore, in order to satisfactorily diffuse the light, it is preferable that the main light ray from the first lens group G1 is incident on the lens surface of the lens L21 perpendicularly as much as possible. In view of this point, it is possible to diffuse the light with the minimum requirements on other lens groups, by satisfying the inequality (7) and forming the lens L21 in a convex meniscus shape on the light reflecting element M2 side. If the value exceeds the upper limit in the inequality (7), the curvature of the lens surface of the lens L21 closer to the intermediate imaging position becomes too large. As a result, the light cannot be satisfactorily diffused unless the imaging plane (primary imaging plane) of the intermediate image generated by the first lens group G1 has a large curvature. This is disadvantageous because the first lens group G1 needs large requirements. On the other hand, if the value falls below the lower limit in the inequality (7), the curvature of the lens surface of the lens L21 closer to the intermediate imaging position becomes too small. As a result, matching of the primary imaging plane formed by the first lens group G1 and a diffusion surface (the lens surface of the lens L21 closer to the intermediate imaging position) is significantly difficult.

Furthermore, in the HMD optical system LS in this embodiment, it is desirable to satisfy the following inequality (10) when the following equations (8) and (9) are defined. It will be noted that in the equation (8), a coefficient of $x^2$ term is fC4, a coefficient of $x^4$ term is fC11, a coefficient of $y^2$ term is fC6, a coefficient of $y^4$ term is fC15 in a case where the free-form surface shape of the lens surface (hereinafter referred to as a front lens surface) on the rotationally symmetrical lens 31 side of the free-form surface lens L32 of the third lens group G3 is represented by the equation (3). In the equation (9), a coefficient of $x^2$ term is rC4, a coefficient of $x^4$ term is rC11, a coefficient of $y^2$ term is rC6, a coefficient of $y^4$ term is rC15 in a case where the free-form surface shape of the lens surface (hereinafter referred to as a rear lens surface) opposite to the front lens surface of the free-form surface lens L32 is represented by the equation (3).

[Math. 8]

$$\left|\frac{1}{2fC4} - \sqrt[3]{\frac{1}{8fC11}}\right| - \left|\frac{1}{2fC6} - \sqrt[3]{\frac{1}{8fC15}}\right| = f\Delta \qquad (8)$$

[Math. 9]

$$\left|\frac{1}{2rC4} - \sqrt[3]{\frac{1}{8rC11}}\right| - \left|\frac{1}{2rC6} - \sqrt[3]{\frac{1}{8rC15}}\right| = r\Delta \qquad (9)$$

[Math. 10]

$$|f\Delta| < |r\Delta| \qquad (10)$$

Meanings of these equations and inequality (8) to (10) will be described below. First of all, a sag amount Sag of a spherical surface having a radius of curvature r is represented by the following equation (11), using a xyz right-handed orthogonal coordinate system having an axis including a center point of the spherical surface as a z-axis (optical axis). It will be noted that the sag amount is an amount of change in the surface position in the optical axis direction at a given distance (height) h in a direction perpendicular to the optical axis, wherein the sag amount is 0 on the optical axis.

[Math. 11]

$$Sag = r - r\sqrt{1 - \frac{h^2}{r^2}} \qquad (11)$$

Here, h in the equation (11) is determined by the following equation (12).

[Math. 12]

$$h = \sqrt{x^2 + y^2} \qquad (12)$$

It will be noted that the equation (11) can be transformed into a form in which K (conic constant)=0 (the value representing a spherical surface) is substituted in the equation (13) of a conic surface, by rationalizing the whole equation and moving the root to the denominator. The equation (13) of a conic surface is very often used as a first term of an equation representing an aspherical shape or the like. It will be noted that c=1/r in the equation (13).

[Math. 13]

$$Z = Sag = \frac{ch^2}{1 + \sqrt{1 - (1+K)c^2h^2}} \qquad (13)$$

Here, by performing a Taylor expansion (precisely, a Maclaurin expansion) of the equation (11), with h being regarded as a variable, and approximating the equation with its terms up to $h^4$, the sag amount Z(=Sag(h)) of the spherical surface is represented by the following equation (14).

[Math. 14]

$$Z = Sag(h) \approx \frac{1}{2r}h^2 + \frac{1}{8r^3}h^4 \qquad (14)$$

By substituting the equation (12) into the equation (14) to rewrite the equation (14) as an equation of x and y, a sag amount Sag(x, y) of the spherical surface is represented by the following equation (15).

[Math. 15]

$$Sag(x, y) \approx \frac{1}{2r}x^2 + \frac{1}{2r}y^2 + \frac{1}{8r^3}x^4 + \frac{1}{4r^3}x^2y^2 + \frac{1}{8r^3}y^4 \quad (15)$$

On the other hand, the sag amount Z of the free-form surface is represented by the following equation (16), by setting the curvature c=0 in order to omit the equation (13) of the conic surface from the equation (3) described above.

[Math. 16]

$$Z = C_2 x + C_3 y + C_4 x^2 + C_5 xy + C_6 y^2 + \ldots + C_{11} x^4 + \ldots + C_{13} x^2 y^2 + \ldots + C_{15} y^4 + \quad (16)$$

Here, in comparison between the equation (15) and the equation (16), it can be found that terms that are related to a spherical surface (i.e. terms corresponding to terms included in the equation (15)) are included in the equation (16) representing the free-form surface. By writing out terms in the equation (16) that are related to a spherical surface, up to the fourth-order, the following equation (17) is obtained.

[Math. 17]

$$Z(\text{TermforSphere}) = C_4 x^2 + C_6 y^2 + C_{11} x^4 + C_{13} x^2 y^2 + C_{15} y^4 \quad (17)$$

Given that coefficients of respective corresponding terms in the equations (15) and (17) described above are equal to each other, the following equations (18) to (22) are obtained.

[Math. 18]

$$C_4 = \frac{1}{2r} \quad (18)$$

[Math. 19]

$$C_6 = \frac{1}{2r} \quad (19)$$

[Math. 20]

$$C_{11} = \frac{1}{8r^3} \quad (20)$$

[Math. 21]

$$C_{13} = \frac{1}{4r^3} \quad (21)$$

[Math. 22]

$$C_{15} = \frac{1}{8r^3} \quad (22)$$

By rearranging the equations (18) to (22) in terms of r, the following equations (23) to (27) are obtained.

[Math. 23]

$$r = \frac{1}{2C_4} \quad (23)$$

[Math. 24]

$$r = \frac{1}{2C_6} \quad (24)$$

[Math. 25]

$$r = \sqrt[3]{\frac{1}{8C_{11}}} \quad (25)$$

[Math. 26]

$$r = \sqrt[3]{\frac{1}{4C_{13}}} \quad (26)$$

[Math. 27]

$$r = \sqrt[3]{\frac{1}{8C_{15}}} \quad (27)$$

Here, if the equations (23)-(27) hold precisely, i.e. if free-form surface coefficients $C_4$-$C_{15}$ are determined so as to satisfy the following equation (28), the equation (17) is an equation representing a spherical surface as an approximation up to the fourth-order.

[Math. 28]

$$\frac{1}{2C_4} = \frac{1}{2C_6} \quad (28)$$
$$= \sqrt[3]{\frac{1}{8C_{11}}}$$
$$= \sqrt[3]{\frac{1}{4C_{13}}}$$
$$= \sqrt[3]{\frac{1}{8C_{15}}}$$

Furthermore, in this case, the free-form surface represented by the equation (16) which entirely includes the equation (17) has a substantial property as a rotationally symmetrical spherical surface particularly in a region closer to the optical axis, in comparison with the case where the equation (28) is not satisfied. Consequently, the surface has only a low degree of freedom as a free-form surface. By taking as a reference the condition where the equation (28) is satisfied and determining values of the free-form surface coefficients $C_4$-$C_{15}$ of the low-order terms by the use of the equations (23) to (27), it is possible to easily estimate a rough superiority or inferiority of rotational asymmetry of the free-form surface.

Thus, in this embodiment, the above described idea is applied to easily determine a rough effectiveness of a free-form surface by determining the free-form surface coefficients of the low-order terms. In this embodiment, the above described idea is further simplified. Namely, deviations from a spherical surface are individually determined in the x-z plane and the y-z plane, which are considered to be particularly important, and a difference between amounts of these deviations is then determined in order to estimate the effectiveness of the free-form surface. In other words, it is determined that the surface has a superior degree of freedom as a free-form surface if the difference between the amounts of the deviations in the x-z plane and the y-z plane is larger. A brief description thereof will be presented below.

First of all, by extracting terms of the free-form surface that are related to a spherical surface, up to the fourth order, from the equation (16) representing the sag amount Z of the free-form surface and dividing the terms into groups for the x-z plane and the y-z plane, the following equations (29) and (30) are obtained.

[Math. 29]

$$Z = C_4 x^2 + C_{11} x^4 \quad (29)$$

[Math. 30]

$$Z = C_6 y^2 + C_{15} y^4 \quad (30)$$

Additionally, by dividing the equation (15) representing the sag amount Z of the spherical surface into equations for the x-z plane and the y-z plane, the following equations (31) and (32) are obtained.

[Math. 31]

$$Z(x) \approx \frac{1}{2r} x^2 + \frac{1}{8r^3} x^4 \quad (31)$$

[Math. 32]

$$Z(y) \approx \frac{1}{2r} y^2 + \frac{1}{8r^3} y^4 \quad (32)$$

By connecting coefficients of respective corresponding terms in the equations (29) to (32) by an equal sign and rearranging them in terms of r in the same manner as described above, the following equations (33) to (36) are obtained.

[Math. 33]

$$r = \frac{1}{2C_4} \quad (33)$$

[Math. 34]

$$r = \sqrt[3]{\frac{1}{8C_{11}}} \quad (34)$$

[Math. 35]

$$r = \frac{1}{2C_6} \quad (35)$$

[Math. 36]

$$r = \sqrt[3]{\frac{1}{8C_{15}}} \quad (36)$$

Given that the difference between the equations (33) and (34) is $\Delta x$ and the difference between the equations (35) and (36) is $\Delta y$, $\Delta x$ and $\Delta y$ are represented by the following equations (37) and (38).

[Math. 37]

$$\Delta x = \frac{1}{2C_4} - \sqrt[3]{\frac{1}{8C_{11}}} \quad (37)$$

[Math. 38]

$$\Delta y = \frac{1}{2C_6} - \sqrt[3]{\frac{1}{8C_{15}}} \quad (38)$$

The equations (37) and (38) represent degrees of deviations from a spherical surface for the coefficients of the terms that are related to a spherical surface in the x-z plane and in the y-z plane, respectively, and represent a spherical surface if the values of $\Delta x$ and $\Delta y$ are "0". Thus, the larger the absolute values of $\Delta x$ and $\Delta y$ are, the larger the aspherical degree is.

Furthermore, a difference $\Delta$ between the absolute values of the equations (37) and (38) is represented by the following equation (39).

[Math. 39]

$$\Delta = |\Delta x| - |\Delta y| \quad (39)$$

$$= \left| \frac{1}{2C_4} - \sqrt[3]{\frac{1}{8C_{11}}} \right| - \left| \frac{1}{2C_6} - \sqrt[3]{\frac{1}{8C_{15}}} \right|$$

The value $\Delta$ represented by the equation (39) is an amount of a deviation between an aspherical shape in the x-z plane and an aspherical shape in the y-z plane, i.e. an amount representing a rotationally asymmetrical aspherical degree, which can be considered as an amount representing a degree as a free-form surface of the surface in a simplified manner. Therefore, as the value $\Delta$ is larger, the surface can be estimated that it has a property as a free-form surface, i.e. a rotationally asymmetrical aspherical surface. On the other hand, if $\Delta=0$, the aspherical shape in the x-z plane and the aspherical shape in the y-z plane are identical to each other, and the surface is considered as having a substantial property as a rotationally symmetrical surface.

In view of the points described above, f$\Delta$ represented by the equation (8) described above indicates a degree as a free-form surface ($\Delta$ in the equation (39)) of the front lens surface of the free-form surface lens L32 of the third lens group G3. On the other hand, r$\Delta$ represented by the equation (9) indicates a degree as a free-form surface degree ($\Delta$ in the equation (39)) of the rear lens surface of the free-form surface lens L32. In the free-form surface lens L32, when the inequality (10) is satisfied, i.e. when the rear lens surface has a larger degree as a free-form surface than that of the front lens surface, the rear lens surface has a superior property as a free-form surface, while the front lens surface has a shape that substantially retains a property as a rotationally symmetrical surface.

Furthermore, in the HMD optical system LS in this embodiment, it is desirable to satisfy the following inequalities (40) and (41), while satisfying the inequality (10) described above. It will be noted that in the inequality (40), a coefficient of $x^2$ term is fC4, a coefficient of $x^4$ term is fC11, a coefficient of $y^2$ term is fC6, a coefficient of $y^4$ term is fC15 in a case where the free-form surface shape of the front lens surface of the free-form surface lens L32 of the third lens group G3 is represented by the equation (3). Furthermore, a radius of curvature of the lens surface of the rotationally symmetrical lens L31 of the third lens group G3 on the free-form surface lens L32 side is defined as Rrot. Furthermore, in the inequality (41), a distance on the optical axis between the rotationally symmetrical lens L31 and the free-form surface lens L32 is defined as D.

[Math. 40]

$$0.5 \leq \frac{1}{4(fC4 \cdot fC6)(Rrot)^2} \leq 1.2 \quad (40)$$

-continued

[Math. 41]

$$0 < D \leq 1 \tag{41}$$

Meanings of these inequalities (40) and (41) will be described below. As described above, if coefficients of terms up to the two-order are equal to each other in comparison between the equation (15) representing a sag amount of a spherical surface and the equation (16) representing a sag amount of a free-form surface, relationships represented by the equations (33) and (35) are established between the radius of curvature r and the free-form surface coefficients C4, C6. If it is assumed that the equations (33) and (35) hold in terms of a free-form surface shape of the front lens surface of the free-form surface lens L32, the square of the radius of curvature Frot of the front lens surface of the free-form surface lens L32 can be represented by the following equation (42). It will be noted that the equation (42) is an equation in which r represented by the equation (33) is substituted for one Frot of Frot·Frot and r represented by the equation (35) is substituted for the other

[Math. 42]

$$(Frot)^2 = Frot \cdot Frot = \frac{1}{4(fC4 \cdot fC6)} \tag{42}$$

In this case, the inequality (40) is an inequality that defines a range of a value of $(Frot)^2/(Rrot)^2$. If the coefficient fC4 of the $x^2$ term and the coefficient fC6 of the $y^2$ term in the front lens surface of the free-form surface lens L32 are equal to each other, and further the radius of curvature Frot determined from the coefficients is equal to the radius of curvature Rrot of the lens surface on the free-form surface lens L32 side in the rotationally symmetrical lens L31, the value of $(Frot)^2/(Rrot)^2$ is "1". As the value of $(Frot)^2/(Rrot)^2$ is closer to "1", the shape particularly near the optical axis of the front lens surface of the free-form surface lens L32 is closer to the shape of the lens surface of the rotationally symmetrical lens L31 on the free-form surface lens L32 side.

Therefore, when the inequality (40) is satisfied, the lens surface of the rotationally symmetrical lens L31 on the free-form surface lens L32 side and the front lens surface of the free-form surface lens L32 have a relatively similar shape to each other. Additionally, when the inequality (41) is satisfied, the distance D on the optical axis of the rotationally symmetrical lens L31 and the free-form surface lens L32 is relatively short. Thus, when the inequalities (40) and (41) are satisfied, a chromatic aberration can be corrected with the lens surface on the free-form surface lens L32 side of the rotationally symmetrical lens L31 and the front lens surface of the free-form surface lens L32, so that the whole third lens group G3 may have a certain capability of correcting the chromatic aberration.

Also, by satisfying the inequality (10) described above in addition to the inequalities (40) and (41), the rear lens surface has a superior property as a free-form surface, while the front lens surface has a shape that substantially retains a property as a rotationally symmetrical surface. Thus, this is particularly preferable because the front lens surface and the rear lens surface can be assigned with different tasks, i.e. in the free-form surface lens L32, the correction of the chromatic aberration and the rotationally symmetrical aberration is mainly performed with the front lens surface and the rotationally symmetrical lens L31, while the correction of the rotationally asymmetrical aberration which is to be generated by the light reflecting element M2 is mainly performed with the rear lens surface. In other words, a balance between the front and rear surface shapes of the free-form surface lens L32 can be optimized and it is possible to efficiently correct the rotationally symmetrical aberration component and the rotationally asymmetrical aberration component. If the inequalities (40), (41), and (10) are not satisfied, correction of the aberrations would be difficult, which is disadvantageous. In particular, correction of the rotationally asymmetrical aberration would be difficult.

In the HMD optical system LS in this embodiment, it is also desirable to satisfy the following inequality (43) in both front and rear lens surfaces of the free-form surface lens L13, given that the coefficient of the $x^2$ term is C4 and the coefficient of the $y^2$ term is C6 in a case where the free-form surface shape of the free-form surface lens L13 of the first lens group G1 is represented by the equation (3).

[Math. 43]

$$\frac{C4}{C6} < 0 \tag{43}$$

The free-form surface lens L13 in the first lens group G1 is provided to assist the correction of the trapezoidal distortion caused by the light reflecting element M2. Therefore, the free-form surface lens L13 itself should correct the rotationally asymmetrical aberration generated by the correction of the trapezoidal distortion so that a good image is formed on the primary imaging plane of the first lens group G1. The inequality (43) is intended to satisfy this condition and defines a condition in which the coefficient C4 of the $x^2$ term and the coefficient C6 of the $y^2$ term have different signs, plus or minus. As also apparent from the equation (28) described above by looking at only the coefficients of the square terms, it can be considered that the property as a rotationally symmetrical spherical surface becomes superior as the coefficient C4 of the $x^2$ term and the coefficient C6 of the $y^2$ term are closer to each other. On the other hand, the property as a free-form surface becomes superior as the coefficient C4 of the $x^2$ term and the coefficient C6 of the $y^2$ term are further from each other. If the inequality (43) is not satisfied, the lens surface of the free-form surface lens L13 has an insufficient property as a free-form surface. Therefore, it is difficult to simultaneously correct the trapezoidal distortion and the light ray aberration, which is disadvantageous.

Furthermore, in the HMD optical system LS in this embodiment, it is desirable to satisfy the following inequality (44), given that a focal length of the whole first lens group G1 is f1 and a distance on the optical axis between the light deflecting element M1 and the light reflecting element M2 is L.

[Math. 44]

$$3.5 \leq \frac{L}{f1} \leq 5.5 \tag{44}$$

The inequality (44) is a conditional inequality for the size of the HMD optical system LS. If the value exceeds the upper limit in the inequality (44), the refracting power of the first lens group G1 becomes too strong with respect to the total length of the HMD optical system LS, which result in a large effective diameter of the HMD optical system LS. Consequently, it is difficult to reduce the size of the HMD optical system LS, which is disadvantageous. The correction of the aberrations becomes also difficult. On the other hand, if the value falls below the lower limit in the inequality (44), the focal length f1 of the first lens group G1 becomes too long with respect to the total length of the HMD optical system LS. As a result, the power balance between the group G1 and other groups is significantly disrupted. Consequently, the correction of the aberrations becomes difficult, which is disadvantageous.

Moreover, in the HMD optical system LS in this embodiment, it is desirable to satisfy the following inequality (45), given that a difference between Abbe numbers vd of two rotationally symmetrical lenses L11, L12 of the first lens group G1 is Δvd1.

[Math. 45]

$$8 < \Delta vd1 < 40 \quad (45)$$

Moreover, it is desirable to satisfy the following inequality (46), given that a difference between Abbe numbers vd of the rotationally symmetrical lens L31 and the free-form surface lens L32 of the third lens group G3 is Δvd2.

[Math. 46]

$$8 < \Delta vd2 < 40 \quad (46)$$

It will be noted that for each lens group, the Abbe number vd is defined by the following equation (47), given that a refractive index with respect to a d-line is Nd, a refractive index with respect to a F-line is NF, and a refractive index with respect to a C-line is NC.

[Math. 47]

$$vd = \frac{Nd - 1}{NF - NC} \quad (47)$$

The inequalities (45) and (46) are intended to effectively correct the chromatic aberration in each of the first lens group G1 and the third lens group G3, while minimizing the occurrence of other aberrations. If the value exceeds the upper limit in the inequalities (45) and (46), a material having a high refractive index has to be used on the negative lens side, with the result that a flatness of the image surface is prone to be deteriorated. Furthermore, because the material having a high refractive index often have a large specific gravity, a weight of the whole HDM optical system LS tends to be increased, which is disadvantageous. On the other hand, if it falls below the lower limit in the inequalities (45) and (46), the chromatic aberration correcting capability becomes poor, which is disadvantageous.

Furthermore, in the HMD optical system LS in this embodiment, a figure formed by combining four points in the light reflecting element M2 is a trapezoidal shape, at which points main light rays among light rays arriving at the reflection surface may arrive, the main light rays having angles of view corresponding to respective four corners of the image drawn on the drawing surface I. Here, given that a base in the positive y-axis direction among bases of the trapezoidal shape is an upper base, a base in the negative direction is a lower base, a length of the upper base is $L_{up}$, and a length of the lower base is $L_{und}$, it is then desirable to satisfy the following inequality (48).

[Math. 48]

$$1 < \frac{L_{up}}{L_{und}} \leq 1.5 \quad (48)$$

In view of the eye motion area described above, it is ideal that the main light rays at respective angles of view for the image drawn on the drawing surface I intersect at one point in a position of the eye (roughly the cornea) of the user. It is required for a practically usable head-mounted display DSP to roughly satisfy this condition (within a diameter of 4 mm, even in the worst case). The inequality (48) is intended to simultaneously satisfy this condition and the correction of the trapezoidal distortion in the drawing surface (image surface) I. If the inequality (48) is not satisfied, it is impossible to simultaneously satisfy the correction of the trapezoidal distortion and condensation of main light rays of light at the eye position, which is significantly disadvantageous.

Furthermore, in the HMD optical system LS in this embodiment, it is desirable that the light reflecting element M2 is made of a light transmission material and configured to be able to transmit light incident from a surface opposite to the reflection surface which reflects the light from the third lens group G3. Furthermore, the HMD optical system LS is desirably configured in such a manner that an image is drawn on the drawing surface I, in a superimposed manner with an image (outer scene) formed by the light having transmitted through the light reflecting element M2 and arrived at the drawing surface I (retina). Thereby, when the user wears the head-mounted display DSP, the user can visually recognize the above described image in a superimposed manner with the image (outer scene) based on the light that has transmitted through the light reflecting element M2.

EXAMPLE

An example according to this embodiment will now be described. FIG. 2 and FIG. 3 are views explaining a configuration of the HMD optical system LS according to this example. The HMD optical system LS according to this example includes a light deflecting element M1, a first lens group G1, a second lens group G2, a third lens group G3, and a light reflecting element M2, in this sequence from a light source (not shown) side.

In this example, the light deflecting element M1 includes a movable part that can continuously and rapidly change a propagating direction of light (for example, generally parallel light such as laser light or LED light) from a light source. For example, a galvanomirror is used. The galvanomirror is configured to rotate by an amount according to a driving voltage input from a driving circuit of a system part, in order to change a reflection angle (i.e. the propagating direction of the light from the light source). With this mechanism, it is possible to form an image on a retina of an user, by scanning an imaging point on the retina of the user in a two-dimensional direction at a high speed.

In this example, a first lens group G1 is composed of four lenses: a rotationally symmetrical lens L11 having a negative refracting power; a rotationally symmetrical lens 12 having a positive refracting power; a neutral density filter F for dimming the light incident from the light deflecting element M1, the neutral density filter F being arranged to be inclined by −5 degrees in the y-z plane with respect to the optical axis; and a rotationally asymmetrical free-form surface lens L3, in this sequence from the light source side.

In this example, the second lens group G2 is composed of a lens L21 that is arranged in the vicinity of the intermediate imaging position made by the first lens group G1 and has a positive refracting power in the y-z plane, wherein a lens surface on the light deflecting element M1 side is a spherical surface and a lens surface on the light reflecting element M2 side is a X-toroidal surface. The lens L21 has a convex meniscus shape on the light reflecting element M2 side in the y-z plane. Furthermore, a microlens array is arranged over the entire lens surface on the light deflecting element M1 side of the lens L21 so that the lens L21, as a whole, functions as also a diffusion plate for diffusing the light from the light source to extend an effective diameter of the light ray in each angle of view. It will be noted that a lens surface on the light deflecting element M1 side of the lens L21 is a lens surface closer to the intermediate imaging position.

In this example, the third lens group G3 is composed of a rotationally symmetrical lens L31 having a negative refracting power, and a rotationally asymmetrical free-form surface lens L32, in this sequence from the light source side.

In this example, the light reflecting element M2 is arranged to be inclined by 25 degrees in the y-z plane with respect to the optical axis and has a reflection surface having a rotationally asymmetrical free-form surface shape for reflecting the light that has passed through the third lens group and directing the light to the eye of the user.

Moreover, in this example, the light reflecting element M2 is made of a transparent material capable of transmitting light and it has a reflection surface for reflecting the light that has transmitted through the third lens group G3 and also has a transmission surface opposite to the reflection surface. Thus, the light reflecting element M2 is a so-called half mirror that is configured to transmit light incident from the transmission surface and allow the light to be incident on the eye of the user. The transmission surface of the light reflecting element M2 has a rotationally asymmetrical free-form surface shape with respect to the optical axis, in a similar manner to the reflection surface.

Moreover, it is assumed that the center of the eye of the user is arranged on the optical axis after reflection by the light reflecting element M2. In this example, the design was performed with a stigmatic lens having a focal length of 17 mm, instead of the eye.

The following Table 1 shows numerical data of the HMD optical system LS according to this example. It will be noted that in Table 1, surface numbers denote numbers of optical surfaces from the light source side, Ry is a radius of curvature in the y-axis direction, Rx is a radius of curvature in the x-axis direction, and D denotes a surface spacing (a distance on the optical axis from an optical surface to the next optical surface), and Nd denotes a refractive index with respect to the d-line.

TABLE 1

| Surface number | Surface Type | Ry | Rx | D | Nd |
|---|---|---|---|---|---|
| s0 | object plane | infinite | <— | infinite | |
| s1 | diaphragm plane | infinite | <— | 8.00000 | |
| s2 | aspherical surface | 29.22450 | <— | 3.60000 | 1.61420 |
| s3 | aspherical surface | 6.82988 | <— | 0.50000 | |
| s4 | aspherical surface | 9.52201 | <— | 4.64956 | 1.53113 |
| s5 | aspherical surface | −11.55702 | <— | 0.50000 | |
| s6 | filter plane | infinite | <— | 0.10038 | 1.51680 |
| s7 | filter plane | infinite | <— | 4.24326 | |
| s8 | free-form surface | 12.66031 | <— | 3.60000 | 1.53113 |
| s9 | free-form surface | 14.97916 | <— | 11.83267 | |
| s10 | spherical surface | −100.00000 | <— | 1.65000 | 1.49080 |
| s11 | X-toroidal surface | −43.68784 | 9.40251 | 6.87359 | |
| s12 | aspherical surface | −61.51808 | <— | 8.44181 | 1.61420 |
| s13 | aspherical surface | 16.61681 | <— | 0.80873 | |
| s14 | free-form surface | infinite | <— | 11.20000 | 1.49080 |
| s15 | free-form surface | infinite | <— | 24.00000 | |
| refl_s16 | free-form surface | infinite | <— | −45.00000 | reflection surface |
| s17 | image surface (drawing surface) | infinite | <— | — | |

As shown in the above Table 1, each of the surfaces s2-s5, s12, s13 is an aspherical surface. The following Table 2 shows values of aspherical surface coefficients of these aspherical surfaces.

TABLE 2

| | (aspherical surface data 1) | | | |
|---|---|---|---|---|
| Coefficients | s2 | s3 | s4 | s5 |
| Ry | 29.22450 | 6.82988 | 9.52201 | −11.55702 |
| K | 0 | 0 | 0 | 0 |
| A4 | −5.48866E−04 | −1.31081E−03 | −4.43283E−04 | −3.85018E−05 |
| A6 | 3.40408E−07 | −7.12036E−06 | −7.34656E−06 | 1.60928E−06 |
| A8 | 2.09680E−07 | 1.71298E−08 | −7.12654E−08 | 4.68098E−10 |
| A10 | −5.06819E−09 | 1.16043E−09 | 9.65326E−10 | −2.04229E−10 |
| A12 | −4.11852E−10 | −4.81902E−11 | 4.74224E−11 | −1.58292E−11 |

TABLE 2-continued (aspherical surface data 2)

| Coefficients | s12 | s13 |
|---|---|---|
| Ry | −61.51808 | 16.61681 |
| K | 0 | 0 |
| A4 | −4.30748E−05 | −5.47315E−05 |
| A6 | 9.98383E−07 | −3.49955E−07 |
| A8 | −4.83228E−09 | −7.40161E−10 |
| A10 | 2.04352E−11 | 3.24607E−12 |
| A12 | −3.54814E−13 | −1.83364E−15 |
| A14 | −2.96196E−15 | 4.31121E−17 |
| A16 | −3.47413E−17 | 2.65999E−19 |
| A18 | 9.15311E−20 | −4.45791E−22 |
| A20 | 5.08369E−21 | −5.50057E−24 |

Furthermore, as shown in the above Table 1, the surface s11 is a X-toroidal surface. The following Table 3 shows values of aspherical surface coefficients of this X-toroidal surface.

TABLE 3

| Coefficient | s11 |
|---|---|
| Rx | 9.40251 |
| Ry | −43.68784 |
| K | 0 |
| T4 | −2.87802E−03 |
| T6 | −2.95453E−06 |
| T8 | 1.41755E−05 |
| T10 | 5.66466E−07 |

Furthermore, as shown in the above Table 1, the surfaces s8, s9, s14-s16 are rotationally asymmetrical free-form surfaces. It will be noted that the surface s16 is a reflection surface. The following Table 4 shows values of coefficients of xy polynomial equations of these free-four surfaces.

TABLE 4

(free-form surface data 1)

| Coefficients | S8 | s9 |
|---|---|---|
| c(curvature) | 12.66030735 | 14.97916071 |
| C1(K) | 0.00000E+00 | 2.37722E+00 |
| C3(y) | −1.22412E−02 | −2.04538E−02 |
| C4($x^2$) | −4.79507E−02 | −7.68109E−02 |
| C5(xy) | 0.00000E+00 | 0.00000E+00 |
| C6($y^2$) | 2.39493E−02 | 3.02232E−02 |
| C7($x^3$) | 0.00000E+00 | 0.00000E+00 |
| C8($x^2y$) | 4.90430E−03 | 6.46110E−03 |
| C9($xy^2$) | 0.00000E+00 | 0.00000E+00 |
| C10($y^3$) | −6.67628E−04 | −1.51376E−03 |
| C11($x^4$) | 1.37514E−03 | 1.43214E−03 |
| C12($x^3y$) | 0.00000E+00 | 0.00000E+00 |
| C13($x^2y^2$) | 2.24698E−04 | 1.92804E−04 |
| C14($xy^3$) | 0.00000E+00 | 0.00000E+00 |
| C15($y^4$) | −1.29326E−04 | −2.83018E−04 |
| C16($x^5$) | 0.00000E+00 | 0.00000E+00 |
| C17($x^4y$) | −1.43304E−04 | −8.14209E−05 |
| C18($x^3y^2$) | 0.00000E+00 | 0.00000E+00 |
| C19($x^2y^3$) | −3.37239E−05 | 3.24514E−07 |
| C20($xy^4$) | 0.00000E+00 | 0.00000E+00 |
| C21($y^5$) | 1.74109E−05 | 4.75077E−05 |
| C22($x^6$) | −1.16028E−05 | 1.57429E−05 |
| C23($x^5y$) | 0.00000E+00 | 0.00000E+00 |
| C24($x^4y^2$) | 1.10855E−06 | −1.89768E−06 |
| C25($x^3y^3$) | 0.00000E+00 | 0.00000E+00 |
| C26($x^2y^4$) | 6.91621E−06 | 1.13882E−05 |
| C27($xy^5$) | 0.00000E+00 | 0.00000E+00 |
| C28($y^6$) | 4.00487E−06 | 8.58738E−06 |
| C29($x^7$) | 0.00000E+00 | 0.00000E+00 |

TABLE 4-continued

| C30($x^6y$) | −4.56638E−07 | −5.37659E−06 |
|---|---|---|
| C31($x^5y^2$) | 0.00000E+00 | 0.00000E+00 |
| C32($x^4y^3$) | 3.85806E−07 | −2.62833E−06 |
| C33($x^3y^4$) | 0.00000E+00 | 0.00000E+00 |
| C34($x^2y^5$) | −2.97916E−07 | −1.25760E−06 |
| C35($xy^6$) | 0.00000E+00 | 0.00000E+00 |
| C36($y^7$) | −1.21878E−07 | −4.54383E−07 |
| C37($x^8$) | −2.75664E−07 | −1.06467E−06 |
| C38($x^7y$) | 0.00000E+00 | 0.00000E+00 |
| C39($x^6y^2$) | 2.25008E−07 | 5.94529E−07 |
| C40($x^5y^3$) | 0.00000E+00 | 0.00000E+00 |
| C41($x^4y^4$) | −2.01362E−08 | 8.40335E−08 |
| C42($x^3y^5$) | 0.00000E+00 | 0.00000E+00 |
| C43($x^2y^6$) | −5.90430E−08 | −2.97768E−07 |
| C44($xy^7$) | 0.00000E+00 | 0.00000E+00 |
| C45($y^8$) | −1.47995E−09 | −4.77896E−09 |
| C46($x^9$) | 0.00000E+00 | 0.00000E+00 |
| C47($x^8y$) | 0.00000E+00 | 0.00000E+00 |
| C48($x^7y^2$) | 0.00000E+00 | 0.00000E+00 |
| C49($x^6y^3$) | 0.00000E+00 | 0.00000E+00 |
| C50($x^5y^4$) | 0.00000E+00 | 0.00000E+00 |
| C51($x^4y^5$) | 0.00000E+00 | 0.00000E+00 |
| C52($x^3y^6$) | 0.00000E+00 | 0.00000E+00 |
| C53($x^2y^7$) | 0.00000E+00 | 0.00000E+00 |
| C54($xy^8$) | 0.00000E+00 | 0.00000E+00 |
| C55($y^9$) | 0.00000E+00 | 0.00000E+00 |
| C56($x^{10}$) | 0.00000E+00 | 0.00000E+00 |
| C57($x^9y$) | 0.00000E+00 | 0.00000E+00 |
| C58($x^8y^2$) | 0.00000E+00 | 0.00000E+00 |
| C59($x^7y^3$) | 0.00000E+00 | 0.00000E+00 |
| C60($x^6y^4$) | 0.00000E+00 | 0.00000E+00 |
| C61($x^5y^5$) | 0.00000E+00 | 0.00000E+00 |
| C62($x^4y^6$) | 0.00000E+00 | 0.00000E+00 |
| C63($x^3y^7$) | 0.00000E+00 | 0.00000E+00 |
| C64($x^2y^8$) | 0.00000E+00 | 0.00000E+00 |
| C65($xy^9$) | 0.00000E+00 | 0.00000E+00 |
| C66($y^{10}$) | 0.00000E+00 | 0.00000E+00 |

(free-form surface data 2)

| Coefficients | s14 | s15 | s16 (reflection surface) |
|---|---|---|---|
| c(curvature) | infinite | infinite | infinite |
| C1(K) | 0.00000E+00 | 0.00000E+00 | 0.00000E+00 |
| C3(y) | 0.00000E+00 | 0.00000E+00 | 0.00000E+00 |
| C4($x^2$) | 3.38664E−02 | −4.54002E−02 | −6.15738E−04 |
| C5(xy) | 0.00000E+00 | 0.00000E+00 | 0.00000E+00 |
| C6($y^2$) | 3.36434E−02 | −3.37166E−02 | −2.35402E−03 |
| C7($x^3$) | 0.00000E+00 | 0.00000E+00 | 0.00000E+00 |
| C8($x^2y$) | −5.58385E−04 | −1.02305E−04 | −3.08743E−05 |
| C9($xy^2$) | 0.00000E+00 | 0.00000E+00 | 0.00000E+00 |
| C10($y^3$) | 4.21932E−04 | 2.72980E−04 | −1.99563E−05 |
| C11($x^4$) | −2.29481E−05 | 8.02671E−05 | −7.08460E−05 |
| C12($x^3y$) | 0.00000E+00 | 0.00000E+00 | 0.00000E+00 |
| C13($x^2y^2$) | −1.54430E−04 | −1.02753E−05 | −2.29566E−05 |
| C14($xy^3$) | 0.00000E+00 | 0.00000E+00 | 0.00000E+00 |
| C15($y^4$) | −7.25766E−06 | 1.19793E−05 | −7.12111E−06 |
| C16($x^5$) | 0.00000E+00 | 0.00000E+00 | 0.00000E+00 |
| C17($x^4y$) | −9.70680E−06 | −2.93798E−06 | 3.43618E−06 |

TABLE 4-continued

| | | | |
|---|---|---|---|
| C18($x^3y^2$) | 0.00000E+00 | 0.00000E+00 | 0.00000E+00 |
| C19($x^2y^3$) | 6.45706E-06 | -2.01459E-06 | 2.76982E-06 |
| C20($xy^4$) | 0.00000E+00 | 0.00000E+00 | 0.00000E+00 |
| C21($y^5$) | -3.46183E-06 | 5.65196E-08 | 7.40762E-07 |
| C22($x^6$) | -8.46018E-07 | -4.79025E-07 | 1.01475E-06 |
| C23($x^5y$) | 0.00000E+00 | 0.00000E+00 | 0.00000E+00 |
| C24($x^4y^2$) | -5.86228E-07 | 9.29455E-08 | -8.17737E-08 |
| C25($x^3y^3$) | 0.00000E+00 | 0.00000E+00 | 0.00000E+00 |
| C26($x^2y^4$) | -1.58046E-07 | 2.95336E-08 | 1.56655E-07 |
| C27($xy^5$) | 0.00000E+00 | 0.00000E+00 | 0.00000E+00 |
| C28($y^6$) | -5.03212E-07 | 2.58381E-07 | 6.16791E-09 |
| C29($x^7$) | 0.00000E+00 | 0.00000E+00 | 0.00000E+00 |
| C30($x^6y$) | 7.24202E-08 | -2.70062E-08 | 1.32694E-08 |
| C31($x^5y^2$) | 0.00000E+00 | 0.00000E+00 | 0.00000E+00 |
| C32($x^4y^3$) | 7.23348E-08 | 3.00835E-08 | -1.15413E-07 |
| C33($x^3y^4$) | 0.00000E+00 | 0.00000E+00 | 0.00000E+00 |
| C34($x^2y^5$) | -9.93621E-09 | 3.10091E-08 | -4.52776E-08 |
| C35($xy^6$) | 0.00000E+00 | 0.00000E+00 | 0.00000E+00 |
| C36($y^7$) | 1.00627E-08 | -9.06014E-09 | -9.31799E-09 |
| C37($x^8$) | 4.29560E-09 | 4.28135E-10 | -1.44084E-09 |
| C38($x^7y$) | 0.00000E+00 | 0.00000E+00 | 0.00000E+00 |
| C39($x^6y^2$) | 1.51442E-09 | -1.78074E-08 | 2.31693E-08 |
| C40($x^5y^3$) | 0.00000E+00 | 0.00000E+00 | 0.00000E+00 |
| C41($x^4y^4$) | 3.56272E-09 | 1.92810E-09 | 1.09225E-09 |
| C42($x^3y^5$) | 0.00000E+00 | 0.00000E+00 | 0.00000E+00 |
| C43($x^2y^6$) | 4.03754E-09 | 2.28979E-09 | -1.13335E-09 |
| C44($xy^7$) | 0.00000E+00 | 0.00000E+00 | 0.00000E+00 |
| C45($y^8$) | 2.72814E-10 | -2.48776E-09 | 5.58966E-10 |
| C46($x^9$) | 0.00000E+00 | 0.00000E+00 | 0.00000E+00 |
| C47($x^8y$) | -1.95707E-09 | -1.70257E-09 | -1.46366E-09 |
| C48($x^7y^2$) | 0.00000E+00 | 0.00000E+00 | 0.00000E+00 |
| C49($x^6y^3$) | -6.44138E-11 | -1.19312E-10 | 1.23046E-09 |
| C50($x^5y^4$) | 0.00000E+00 | 0.00000E+00 | 0.00000E+00 |
| C51($x^4y^5$) | -1.36849E-11 | 4.47695E-10 | 6.19476E-10 |
| C52($x^3y^6$) | 0.00000E+00 | 0.00000E+00 | 0.00000E+00 |
| C53($x^2y^7$) | 1.24875E-10 | -2.30615E-11 | 3.21687E-10 |
| C54($xy^8$) | 0.00000E+00 | 0.00000E+00 | 0.00000E+00 |
| C55($y^9$) | -6.91918E-11 | -8.94855E-12 | 4.96633E-11 |
| C56($x^{10}$) | 1.70282E-10 | 7.42339E-11 | -1.23571E-10 |
| C57($x^9y$) | 0.00000E+00 | 0.00000E+00 | 0.00000E+00 |
| C58($x^8y^2$) | 2.24934E-12 | 2.37601E-10 | -3.04716E-10 |
| C59($x^7y^3$) | 0.00000E+00 | 0.00000E+00 | 0.00000E+00 |
| C60($x^6y^4$) | 3.37067E-12 | -7.07739E-12 | -1.54154E-10 |
| C61($x^5y^5$) | 0.00000E+00 | 0.00000E+00 | 0.00000E+00 |
| C62($x^4y^6$) | -2.27418E-11 | 5.91122E-12 | 1.03088E-11 |
| C63($x^3y^7$) | 0.00000E+00 | 0.00000E+00 | 0.00000E+00 |
| C64($x^2y^8$) | 2.82575E-13 | -1.18488E-11 | -9.79045E-12 |
| C65($xy^9$) | 0.00000E+00 | 0.00000E+00 | 0.00000E+00 |
| C66($y^{10}$) | -5.02534E-12 | -8.25320E-13 | -4.54704E-12 |

Moreover, values corresponding to the above equations and inequalities (6)-(10), (40), (41), (43)-(46), (48) which are conditions to be desirably satisfied in this embodiment will be listed below.

$$9.40250/(-43.68784) = -0.21522 \quad -0.5<-0.21522<0 \quad \text{Inequality (6)}$$

$$-|-43.68784|/(-100) = 0.43688 \quad 0<0.43688<1 \quad \text{Inequality (7)}$$

[Math. 49]

$$\left| \frac{1}{2*0.03387} - \sqrt[3]{\frac{1}{8*(-2.29481*10^{-5})}} \right| -$$

$$\left| \frac{1}{2*0.03364} - \sqrt[3]{\frac{1}{8*(-7.25766*10^{-6})}} \right| = -8.33084 \quad \text{Equation (8)}$$

[Math. 50]

$$\left| \frac{1}{2*(-0.04540)} - \sqrt[3]{\frac{1}{8*8.02671*10^{-5}}} \right| -$$

$$\left| \frac{1}{2*(-0.03372)} - \sqrt[3]{\frac{1}{8*1.19793*10^{-5}}} \right| = -14.07578 \quad \text{Equation (9)}$$

$$|-8.33084|<|-14.07578| \quad \text{Inequality (10)}$$

$$1/(4*0.03387*0.03364*16.61681*16.61681) = 0.79465$$
$$0.5<0.79465<1.2 \quad \text{Inequality (40)}$$

$$D=0.80873 \quad 0<0.80873<1 \quad \text{Inequality (41)}$$

$s8$ surface: $(-0.04795)/0.02395 = -2.00209<0$ $S9$ surface: $(-0.07681)/0.03022 = -2.54169<0 \quad \text{Inequality (43)}$ $L=90.0000 \quad f1=20.6758 \quad L/f1=4.3529 \quad \text{Inequality (44)}$ $L11:vd=(1.61420-1)/(1.63140-1.60740)=25.59167$ $L12:vd=(1.53113-1)/(1.53783-1.52830)=55.73243$ $L12vd-L11vd=30.14076 \quad 8<30.14076<40 \quad \text{Inequality (45)}$ $L31:vd=(1.61420-1)/(1.63140-1.60740)=25.59167$ $L32:vd=(1.49080-1)/(1.49600-1.48830)=63.74026$ $L32vd-L31vd=38.14859 \quad 8<38.14859<40 \quad \text{Inequality (46)}$ $Lup/Lund=8.1015/7.01762=1.15445 \quad 1<1.15445<1.5 \quad \text{Inequality (48)}$ Since the HMD optical system LS according to this example satisfies all conditional inequalities (6), (7), (10), (40), (41), (43)-(46), (48) as described above, the above described effects can be achieved.

Figure 5:
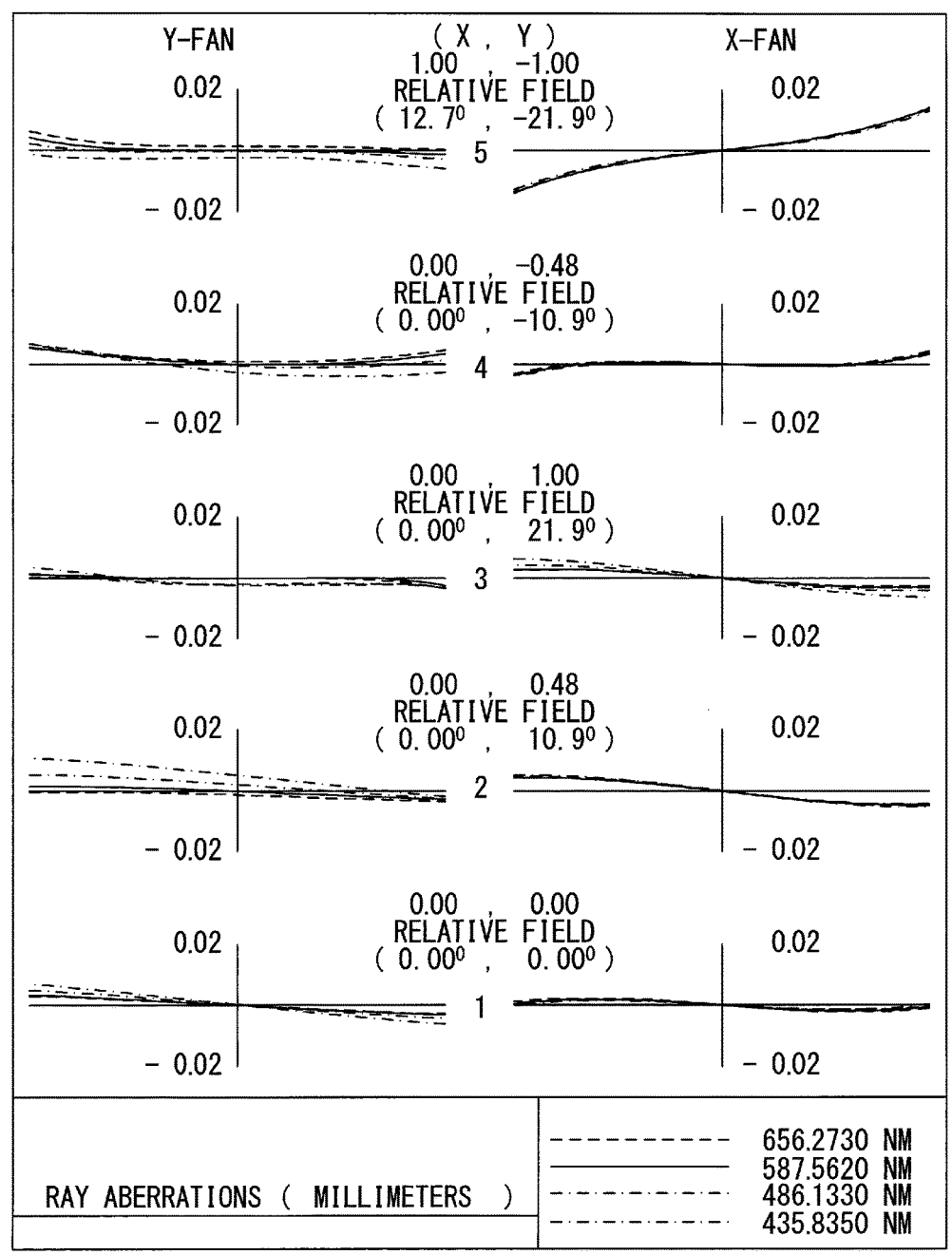
[FIG. 5] A view of a lateral aberration of the head-mounted display optical system.
Figure 6:
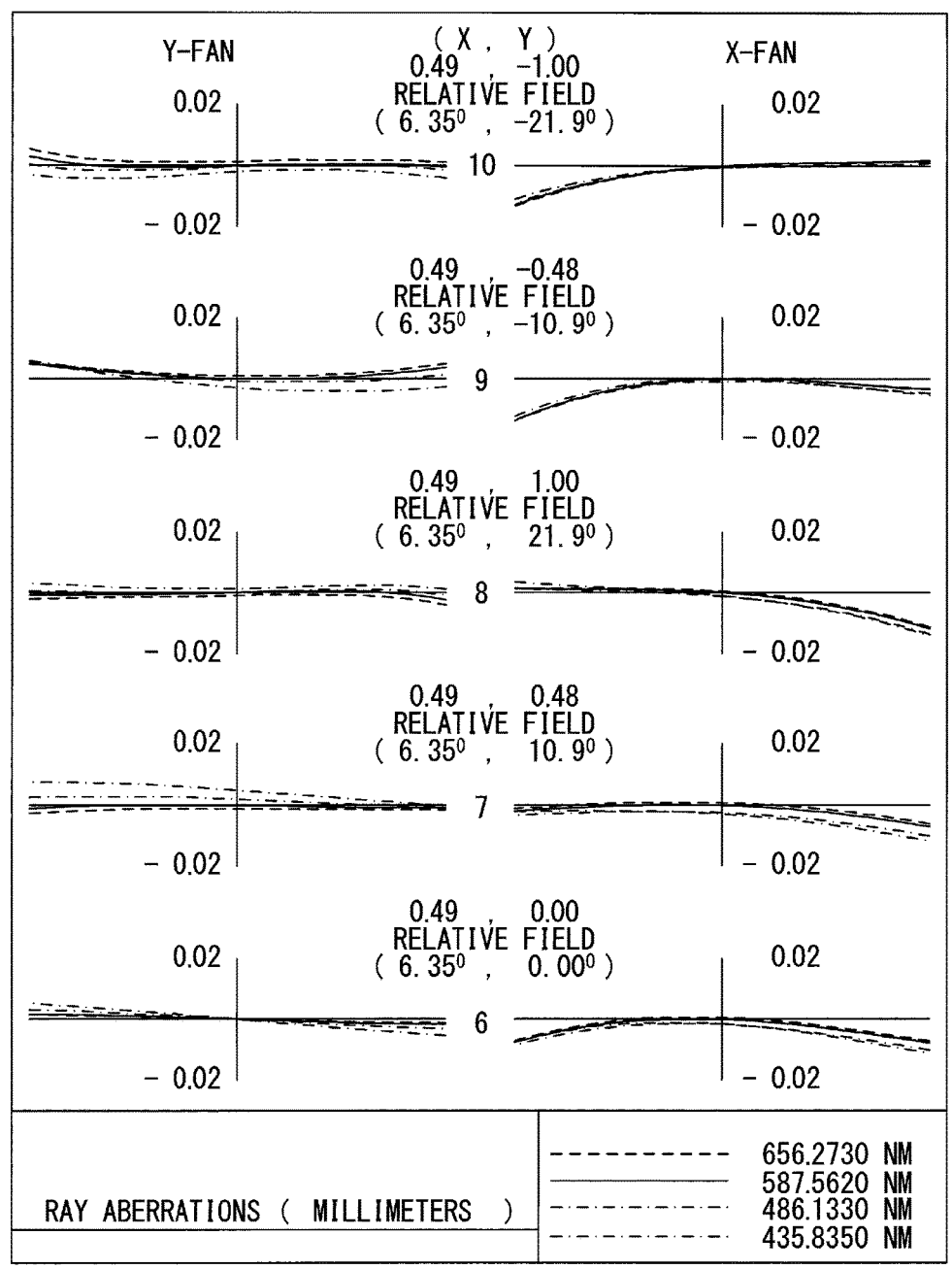
[FIG. 6] A view of a lateral aberration of the head-mounted display optical system.
Figure 7:
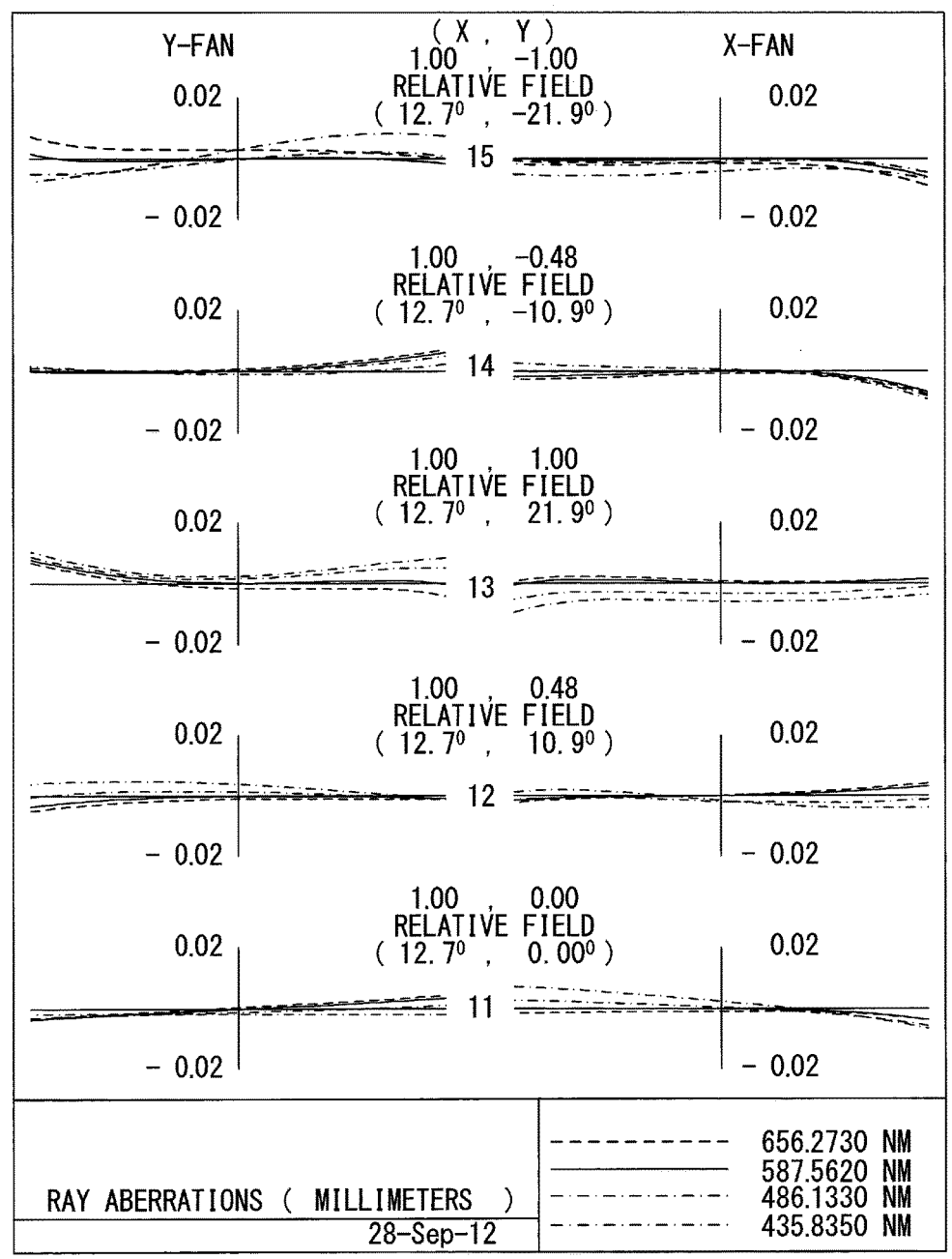
[FIG. 7] A view of a lateral aberration of the head-mounted display optical system.
Figure 8:
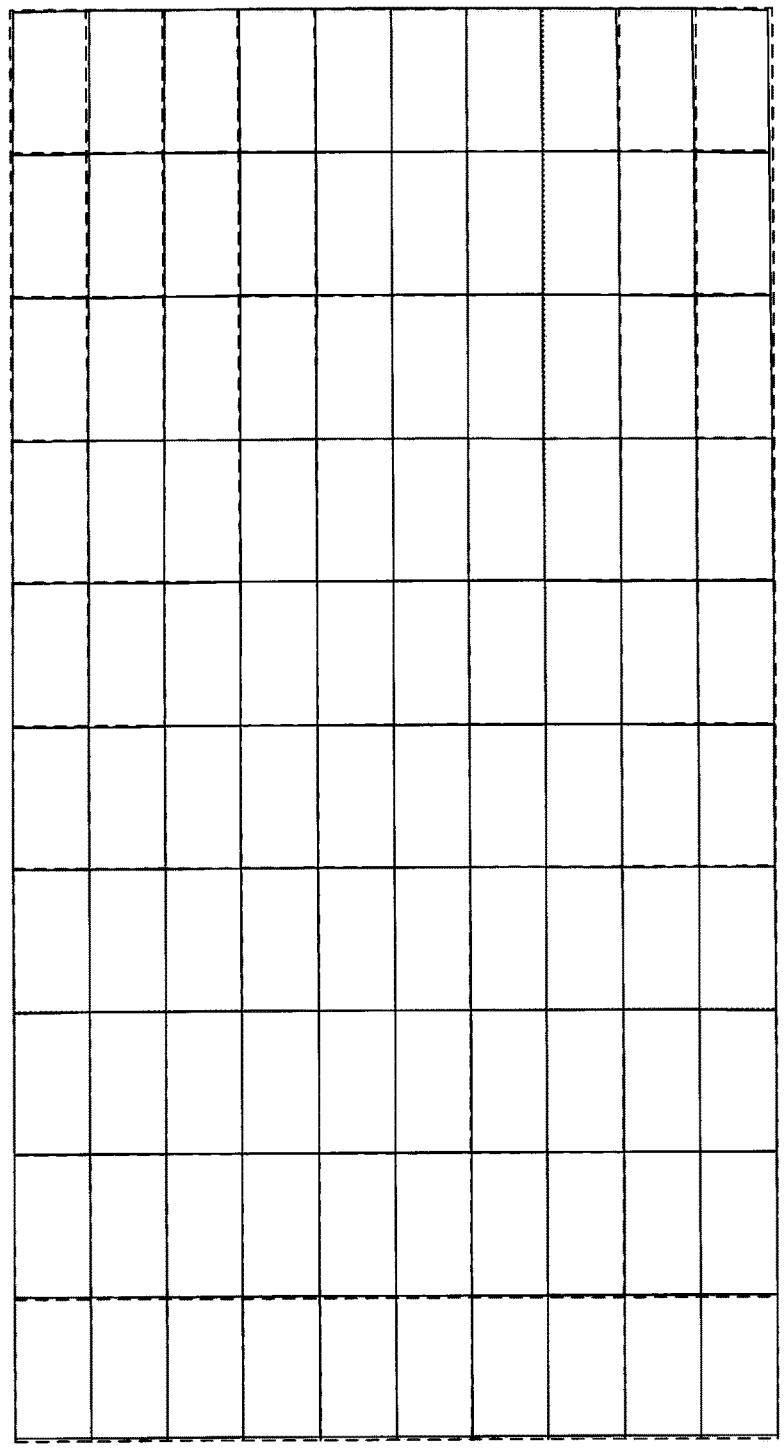
[FIG. 8] A view of a distortion aberration of the head-mounted display optical system.

FIGS. 5 to 7 show a lateral aberration diagram of the HMD optical system LS according to this example. FIG. 8 shows a distortion aberration diagram of the HMD optical system LS according to this example. According to FIGS. 5 to 8, it can be found that in the HMD optical system LS according to this example, a trapezoidal distortion is successfully corrected so that the HMD optical system LS has an excellent imaging performance.

According to the embodiment described above, the following effects can be achieved.

(1) The HMD optical system LS includes a light deflecting element M1, a first lens group G1, a second lens group G2, a third lens group G3, and a light reflecting element M2, in this sequence from a light source side. The first lens group G1 is composed of a plurality of rotationally symmetrical lenses L11, L12 and one free-form surface lens L13. The second lens group G2 is composed of a lens L21 that is arranged in the vicinity of the intermediate imaging position made by the first lens group G1. The third lens group G3 is composed of one rotationally symmetrical lens L31 and one free-form surface lens L32. In this way, a reduction in size of the whole HMD optical system LS can be achieved because the light from the light source is reflected in an oblique direction by the light reflecting element M2. In addition, in the HMD optical system LS, the rotationally asymmetrical aberration and the trapezoidal distortion generated by reflecting the light from the light source in an oblique direction can be corrected with the free-form surface lenses L13, L32 and the free-form surface of the light reflecting element M2, and further the number of the lenses can be reduced in order to reduce the weight of the whole system. Therefore, with the above described configuration, the HMD optical system LS can have a reduced size and weight and an excellent optical performance.

(2) In the HMD optical system LS, the lens surface on the light reflecting element M2 side of the lens L21 constituting the second lens group G2 is formed as a X-toroidal surface and the condition of the inequality (6) is satisfied. By forming the lens surface of the lens L21 as the X-toroidal surface in this way, different aberration components (astigmatism components) in the x-axis direction and in the y-axis direction caused by the oblique reflection of the light reflecting element M2 can be efficiently corrected. In addition, by forming the surface on the light reflecting element M2 side as the X-toroidal surface, the light rays from respective angles of view can be received in a wider region of the lens surface. Furthermore, by satisfying the inequality (6), it is possible to more finely perform the correction of the astigmatism component of the aberration and the adjustment of the trapezoidal distortion.

(3) In the HMD optical system LS, the lens L21 constituting the second lens group G2 has a convex meniscus shape on the light reflecting element side, and the lens surface closer to the intermediate imaging position has a function as a diffusion plate, and further the condition of the inequality (7) is satisfied. In this way, light can be diffused without loads on other lens groups so that a light flux diameter after diffusion can be wider and therefore the eye motion area can be set larger.

(4) In the HMD optical system LS, the conditions of the inequalities (10), (40), and (41) are satisfied in the rotationally symmetrical lens L31 and the free-form surface lens L32 of the third lens group G3. In this way, the correction of the chromatic aberration and the rotationally symmetrical aberration is mainly performed with the front lens surface and the rotationally symmetrical lens L31 of the free-form surface lens L32, while the correction of the rotationally asymmetrical aberration which would be generated by the light reflecting element M2 is mainly performed with the rear lens surface. Thus, the rotationally symmetrical aberration component and the rotationally asymmetrical aberration component can be efficiently corrected.

(5) In the HMD optical system LS, the condition of the inequality (43) is satisfied in both front and rear lens surfaces of the free-form surface lens L13 of the first lens group G1. Therefore, the free-form surface lens L13 itself can correct the trapezoidal distortion generated by the light reflecting element M2 and further correct the rotationally asymmetrical aberration generated by the correction of the trapezoidal distortion, so that a good image can be formed on the primary imaging plane of the first lens group G1.

(6) In the HMD optical system LS, the focal length f1 of the whole first lens group G1 and a distance L on the optical axis between the light deflecting element M1 and the light reflecting element M2 satisfy the condition of the inequality (44). Thereby, a reduction in size of the HMD optical system LS can be achieved and the aberration correction can be properly performed.

(7) In the HMD optical system LS, the difference vd1 of the Abbe numbers of two rotationally symmetrical lenses L11, L12 of the first lens group G1 satisfies the condition of the inequality (45), and the difference vd2 of the Abbe numbers of the rotationally symmetrical lens L31 and the free-form surface lens L32 of the third lens group G3 satisfies the condition of the inequality (46). Thereby, the chromatic aberration can be efficiently corrected, while minimizing the occurrence of other aberrations.

(8) In the HMD optical system LS, a figure formed by combining four points in the light reflecting element M2 is a trapezoidal shape, at which points main light rays among light rays arriving at the reflection surface may arrive, the main light rays having angles of view corresponding to respective four corners of the image drawn on the drawing surface I, and the trapezoidal shape satisfies the condition of the following inequality (48). Thereby, the main light rays at respective angles of view for the image drawn on the drawing surface I can be condensed at one point in the position of the eye of the user, and also a trapezoidal distortion on the drawing surface I can be corrected.

—Variations—

Although the two rotationally symmetrical lenses L11, L12 are provided in the first lens group G1 in the example described above, three or more rotationally symmetrical lenses may be provided in the first lens group G1. In this case, it is desirable to satisfy the above described inequality (45), given that the maximum of a difference between Abbe numbers vd of a plurality of rotationally symmetrical lenses in the first lens group G1 is Δvd1.

In the example described above, an example has been described in which the lens surface on the light reflecting element M2 side of the lens L21 of the second lens group G2 is formed as a X-toroidal surface. However, the lens surface on the light deflecting element M1 side of the lens L21 may be formed as a X-toroidal surface.

In the embodiment described above, an example has been described in which the light reflecting element M2 is a half mirror so that the image can be visually recognized in a superimposed manner on the image (outer scene) based on the light transmitting through the light reflecting element M2. However, the present invention is also applicable to a head-mounted display in which the light reflecting element M2 is a non-transmission surface.

The above described description is merely exemplary and the present invention is not limited to the above described configurations. A variety of aspects may be changed. For example, the radius of curvature, the surface spacing, the glass material, or the like of the lenses constituting each lens group may be changed as required.

The disclosure of the following priority application is herein incorporated by reference:

Japanese Patent Application No. 2013-207295 (filed Oct. 2, 2013)

REFERENCE SIGNS LIST

DSP . . . head-mounted display, LS . . . HMD optical system, M1 . . . light deflecting element, M2 . . . light reflecting element, G1 . . . first lens group, G2 . . . second lens group, G3 . . . third lens group, L11, L12, L31 . . . rotationally symmetrical lens, L21 . . . lens, L13, L32 . . . free-form surface lens

The invention claimed is:

1. A head-mounted display optical system comprising, in sequence on an optical path from a light source to a drawing surface:

a light deflecting element changing a propagating direction of light from the light source;

a first lens group having a positive refracting power as a whole, the first lens group including a first rotationally symmetrical lens formed in a rotationally symmetrical manner with respect to an optical axis, and a first free-form surface lens formed in a rotationally asymmetrical manner with respect to the optical axis, the first lens group condensing the light incident through the light deflecting element;

a second lens group including a lens having a positive refracting power that is arranged in a vicinity of an imaging position of an intermediate image formed by the first lens group;

a third lens group including a second rotationally symmetrical lens formed in a rotationally symmetrical manner with respect to the optical axis, and a second free-form surface lens formed in a rotationally asymmetrical manner with respect to the optical axis; and a light reflecting element having a reflection surface that reflects the light having transmitted through the third lens group to the drawing surface, the reflection surface having a free-form surface shape formed in a rotationally asymmetrical manner with respect to the optical axis, wherein the light having reflected from the reflection surface and arrived at the drawing surface moves on the drawing surface in accordance with changes of the propagating direction of the light from the light source made by the light deflecting element, so that an image is drawn on the drawing surface, and given that a focal length of the whole first lens group is f1, and a distance on the optical axis between the light deflecting element and the light reflecting element is L, then the following inequality (9)

[Math. 9]

$$3.5 \leq \frac{L}{f1} \leq 5.5 \quad (9)$$

is satisfied.

2. The head-mounted display optical system according to claim 1, wherein:

the lens constituting the second lens group has a convex meniscus shape on a side of the light reflecting element, and a first lens surface closer to the imaging position of the intermediate image is formed with a diffusion plate that diffuses the light from the light source; and given that a coordinate axis in a direction of the optical axis between the light deflecting element and the light reflecting element is a z-axis, a coordinate axis perpendicular to the z-axis in a cross section including the optical axis between the first lens group and the light reflecting element and the optical axis between the light reflecting element and the drawing surface is a y-axis, a radius of curvature in the y-axis direction of the first lens surface having a function as the diffusion plate is Ry1, and a radius of curvature in the y-axis direction of a second lens surface opposite to the first lens surface is Ry2 in the lens constituting the second lens group, then the following inequality (2)

[Math. 2]

$$0 < -\frac{|Ry2|}{Ry1} \leq 1 \quad (2)$$

is satisfied.

3. The head-mounted display optical system according to claim 1, wherein:

given that a coordinate axis in a direction of the optical axis between the light deflecting element and the light reflecting element is a z-axis, a coordinate axis perpendicular to the z-axis in a cross section including the optical axis between the light deflecting element and the light reflecting element and the optical axis between the light reflecting element and the drawing surface is a y-axis, and a coordinate axis perpendicular to the z-axis and the y-axis is an x-axis, a coordinate system (x, y, z) having an intersection point between a lens surface of the second free-form surface lens and the optical axis as an origin is defined in the third lens group, in a case where a sag amount z of a first lens surface and a second lens surface, opposite the first lens surface, of the second free-form surface lens are represented by respective polynomials of x and y having a coefficient of $x^2$ term is fC4, a coefficient of $x^4$ term is fC11, a coefficient of $y^2$ term is fC6, and a coefficient of $y^4$ term is fC15 for the first lens surface, the first lens surface being on a side of the second rotationally symmetrical lens, and a coefficient of $x^2$ term is rC4, a coefficient of $x^4$ term is rC11, a coefficient of $y^2$ term is rC6, and a coefficient of $y^4$ term is rC15 for the second lens surface, and the following equations (3) and (4)

[Math. 3]

$$\left| \frac{1}{2fC4} - \sqrt[3]{\frac{1}{8fC11}} \right| - \left| \frac{1}{2fC6} - \sqrt[3]{\frac{1}{8fC15}} \right| = f\Delta \quad (3)$$

[Math. 4]

$$\left| \frac{1}{2rC4} - \sqrt[3]{\frac{1}{8rC11}} \right| - \left| \frac{1}{2rC6} - \sqrt[3]{\frac{1}{8rC15}} \right| = r\Delta \quad (4)$$

are defined, then the following inequality (5)

[Math. 5]

$$|f\Delta| < |r\Delta| \quad (5)$$

is satisfied, and additionally, given that, in the third lens group, a radius of curvature of a lens surface on a side of the second free-form surface lens of the second rotationally symmetrical lens is Rrot, in millimeters (mm), and a distance on the optical axis between the second rotationally symmetrical lens and the second free-form surface lens is D, in mm, then the following inequalities (6) and (7)

[Math. 6]

$$0.5 \leq \frac{1}{4(fC4 \cdot fC6)(Rrot)^2} \leq 1.2 \quad (6)$$

-continued

[Math. 7]
$$0 < D \leq 1 \quad (7)$$

are satisfied.

4. The head-mounted display optical system according to claim 1, wherein:
given that
a coordinate axis in a direction of the optical axis between the light deflecting element and the light reflecting element is a z-axis,
a coordinate axis perpendicular to the z-axis in a cross section including the optical axis between the light deflecting element and the light reflecting element and the optical axis between the light reflecting element and the drawing surface is a y-axis,
a coordinate axis perpendicular to the z-axis and the y-axis is an x-axis,
a coordinate system (x, y, z) having an intersection point between a lens surface of the first free-form surface lens and the optical axis as an origin is defined in the first lens group, and
in a case where a sag amount z of the lens surface of the first free-form surface lens is represented by a polynomial of x and y having a coefficient of an $x^2$ term is C4 and a coefficient of an $y^2$ term is C6,
then the following inequality (8)

[Math. 8]
$$\frac{C4}{C6} < 0 \quad (8)$$

is satisfied.

5. The head-mounted display optical system according to claim 1, wherein:
given that
a refractive index with respect to a d-line is Nd,
a refractive index with respect to a F-line is NF, and
a refractive index with respect to a C-line is NC,
an Abbe number is defined by the following equation (10)

[Math. 10]
$$vd = \frac{Nd - 1}{NF - NC} \quad (10)$$

a maximum of a difference between Abbe numbers vd of the first rotationally symmetrical lens of the first lens group is Δvd1, and
a difference between Abbe numbers vd of the second rotationally symmetrical lens and the second free-form surface lens of the third lens group is Δvd2,
then the following inequalities (11) and (12)

[Math. 11]
$$8 < \Delta vd1 < 40 \quad (11)$$

[Math. 12]
$$8 < \Delta vd2 < 40 \quad (12)$$

are satisfied.

6. The head-mounted display optical system according to claim 1, wherein:
given that
a coordinate axis in a direction of the optical axis between the light deflecting element and the light reflecting element is a z-axis,
a coordinate axis perpendicular to the z-axis in a cross section including the optical axis between the light deflecting element and the light reflecting element and the optical axis between the light reflecting element and the drawing surface is a y-axis,
a negative direction of the y-axis is a direction to which the optical axis is folded by the light reflecting element,
in the light reflecting element, a figure formed by combining four points is a trapezoidal shape, at which points main light rays among light rays arriving at the reflection surface arrive, the main light rays having angles of view corresponding to respective four corners of the image,
a base in a positive direction of the y-axis among bases of the trapezoidal shape is an upper base,
a base in a negative direction is a lower base,
a length of the upper base is $L_{up}$), and
a length of the lower base is $L_{und}$,
then the following inequality (13)

[Math. 13]
$$1 < \frac{L_{up}}{L_{und}} \leq 1.5 \quad (13)$$

is satisfied.

7. The head-mounted display optical system according to claim 1, wherein:
the light reflecting element is made of a light transmission material and configured to transmit light incident from a surface opposite to the reflection surface; and
the image is drawn on the drawing surface, superimposed on an image formed by the light having transmitted through the light reflecting element and arrived at the drawing surface.

8. A head-mounted display comprising:
the head-mounted display optical system according to claim 1.

9. The head-mounted display optical system according to claim 1, wherein:
given that
a coordinate axis in a direction of the optical axis between the light deflecting element and the light reflecting element is a z-axis,
a coordinate axis perpendicular to the z-axis in a cross section including the optical axis between the light deflecting element and the light reflecting element and the optical axis between the light reflecting element and the drawing surface is a y-axis, and
a coordinate axis perpendicular to the z-axis and the y-axis is an x-axis,
then at least one lens surface of the lens constituting the second lens group is formed as an X-toroidal surface having an aspherical shape in the x-axis direction.

10. The head-mounted display optical system according to claim 9, wherein:

a lens surface on a side of the light reflecting element of the lens constituting the second lens group is formed as the X-toroidal surface, and given that a radius of curvature in the x-axis direction is Rx and a radius of curvature in the y-axis direction is Ry, then the following inequality (1)

[Math. 1]

$$-0.5 \leq \frac{Rx}{Ry} < 0 \qquad (1)$$

is satisfied.

* * * * *

UNITED STATES PATENT AND TRADEMARK OFFICE
CERTIFICATE OF CORRECTION

| | | |
|---|---|---|
| PATENT NO. | : 10,175,486 B2 | Page 1 of 1 |
| APPLICATION NO. | : 15/023256 | |
| DATED | : January 8, 2019 | |
| INVENTOR(S) | : Nobuaki Watanabe | |

It is certified that error appears in the above-identified patent and that said Letters Patent is hereby corrected as shown below:

In the Claims

In Column 30, Line 24:
In Claim 6, Delete "$L_{up}$)," and insert -- $L_{up}$, --, therefor.

Signed and Sealed this
Sixteenth Day of April, 2019

Andrei Iancu
*Director of the United States Patent and Trademark Office*